Sept. 25, 1956 S. M. MERCIER 2,764,278
CONTROL MECHANISM FOR STACKER-CONVEYER SYSTEM
Original Filed Sept. 18, 1950 13 Sheets-Sheet 1
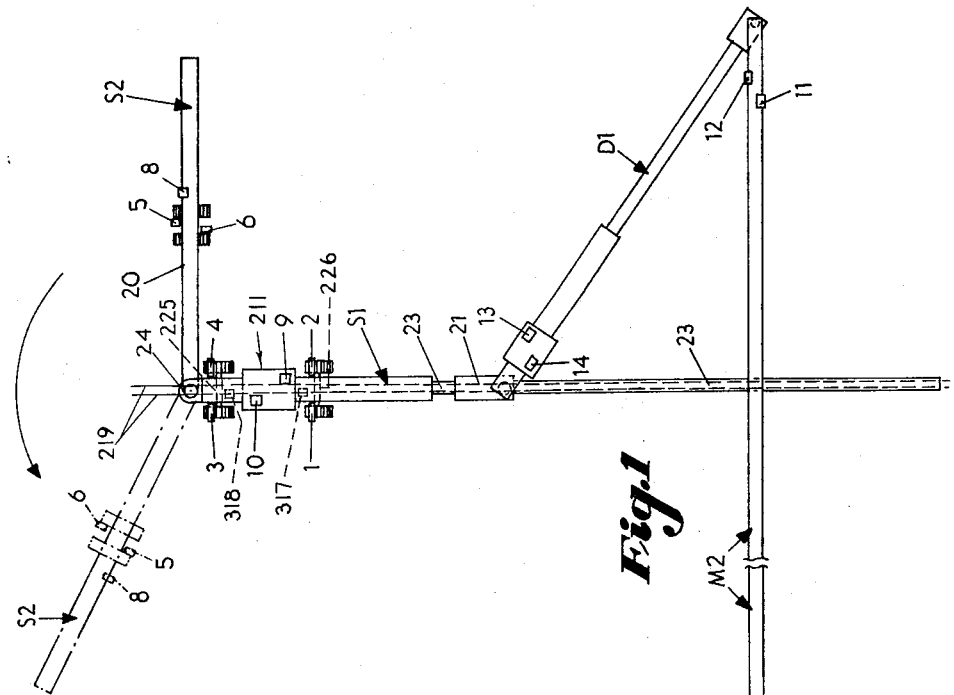
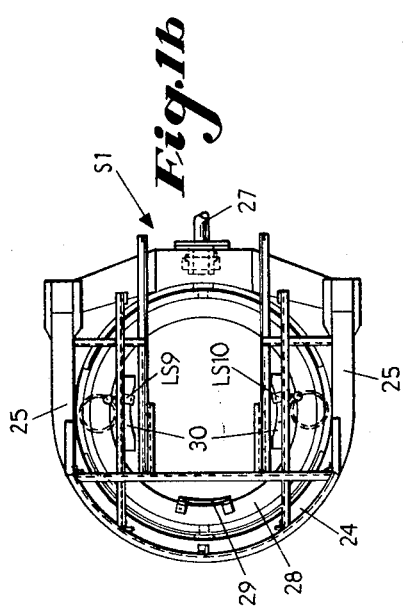
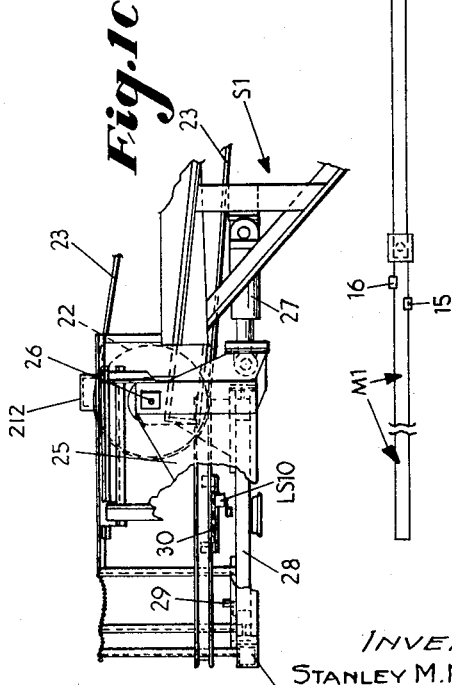
INVENTOR;
STANLEY M. MERCIER,
BY
ATTY.

Sept. 25, 1956     S. M. MERCIER     2,764,278
CONTROL MECHANISM FOR STACKER-CONVEYER SYSTEM
Original Filed Sept. 18, 1950     13 Sheets-Sheet 2

INVENTOR;
STANLEY M. MERCIER,
BY
ATT'Y.

Sept. 25, 1956  S. M. MERCIER  2,764,278
CONTROL MECHANISM FOR STACKER-CONVEYER SYSTEM
Original Filed Sept. 18, 1950  13 Sheets-Sheet 5

INVENTOR;
STANLEY M. MERCIER,
BY
ATT'Y.

Sept. 25, 1956     S. M. MERCIER     2,764,278
CONTROL MECHANISM FOR STACKER-CONVEYER SYSTEM
Original Filed Sept. 18, 1950     13 Sheets-Sheet 10

INVENTOR;
STANLEY M. MERCIER,
BY
ATT'Y.

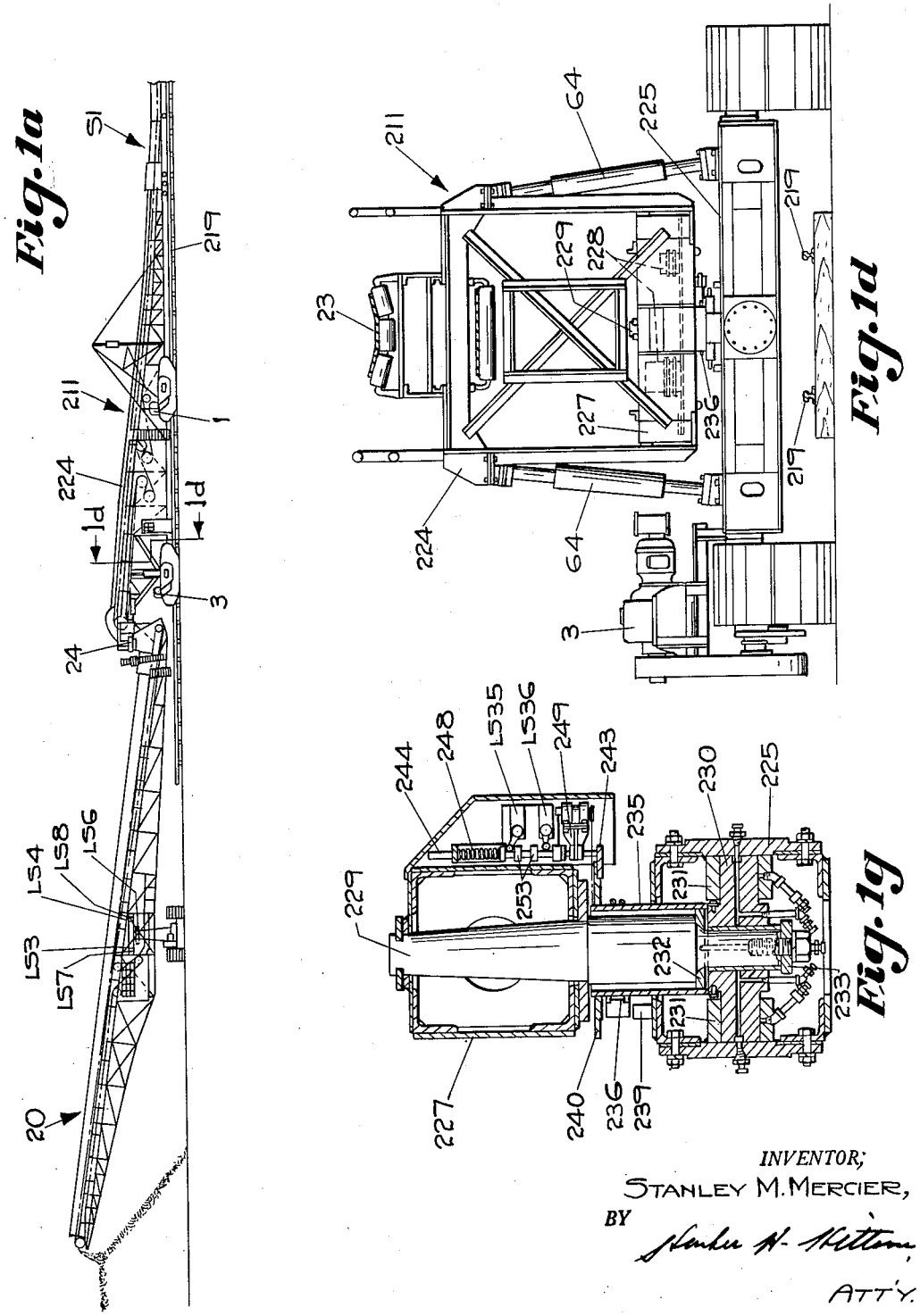

Sept. 25, 1956  S. M. MERCIER  2,764,278
CONTROL MECHANISM FOR STACKER-CONVEYER SYSTEM
Original Filed Sept. 18, 1950  13 Sheets-Sheet 13

INVENTOR;
STANLEY M. MERCIER,
BY
Harker H. Kittson
ATT'Y.

United States Patent Office 2,764,278
Patented Sept. 25, 1956

2,764,278

CONTROL MECHANISM FOR STACKER-CONVEYER SYSTEM

Stanley M. Mercier, Bexley, Ohio, assignor to The Jeffrey Manufacturing Company, a corporation of Ohio Original application September 18, 1950, Serial No. 185,425, now Patent No. 2,734,642, dated February 14, 1956. Divided and this application April 23, 1953, Serial No. 350,596

7 Claims. (Cl. 198—233)

This invention relates particularly to the control apparatus or system for a stacker-conveyer arrangement, and an object of the invention is to provide a control system which is very comprehensive in its coverage, yet extremely flexible and which will control automatically functions of the stacker and/or associated conveyers.

Another object of the invention is to provide a stacker-conveyer system in which the head section of the trailing conveyer to which the stacker is pivotally connected is provided with both slew and drift controls preferably for both front and rear bolsters, there further being by-pass circuits for these controls.

Other objects of the invention will appear hereinafter, the novel features and combinations being set forth in the appended claims.

In the accompanying drawings:

Fig. 1 is a diagrammatic plan view showing one form of stacker-conveyer system or arrangement incorporating features of my invention;

Fig. 1a is a somewhat diagrammatic side elevational view of part of the stacker-conveyer seen in Fig. 1;

Fig. 1b is a plan view of the head portion of the head section of the trailing conveyer showing particularly the bull ring connection between said head section of the trailing conveyer and the stacker boom, together with the associated control switches;

Fig. 1c is an elevational view, with parts broken away, of the structure shown in Fig. 1b, with some additional portion of the head section of the trailing conveyer also being shown;

Fig. 1d is a view in section, the section being taken substantially on line 1d—1d of Fig. 1a with parts omitted;

Fig. 1g is a view in section, the section being taken substantially on line 1g—1g of Fig. 1e with certain parts omitted;

Figure 2:
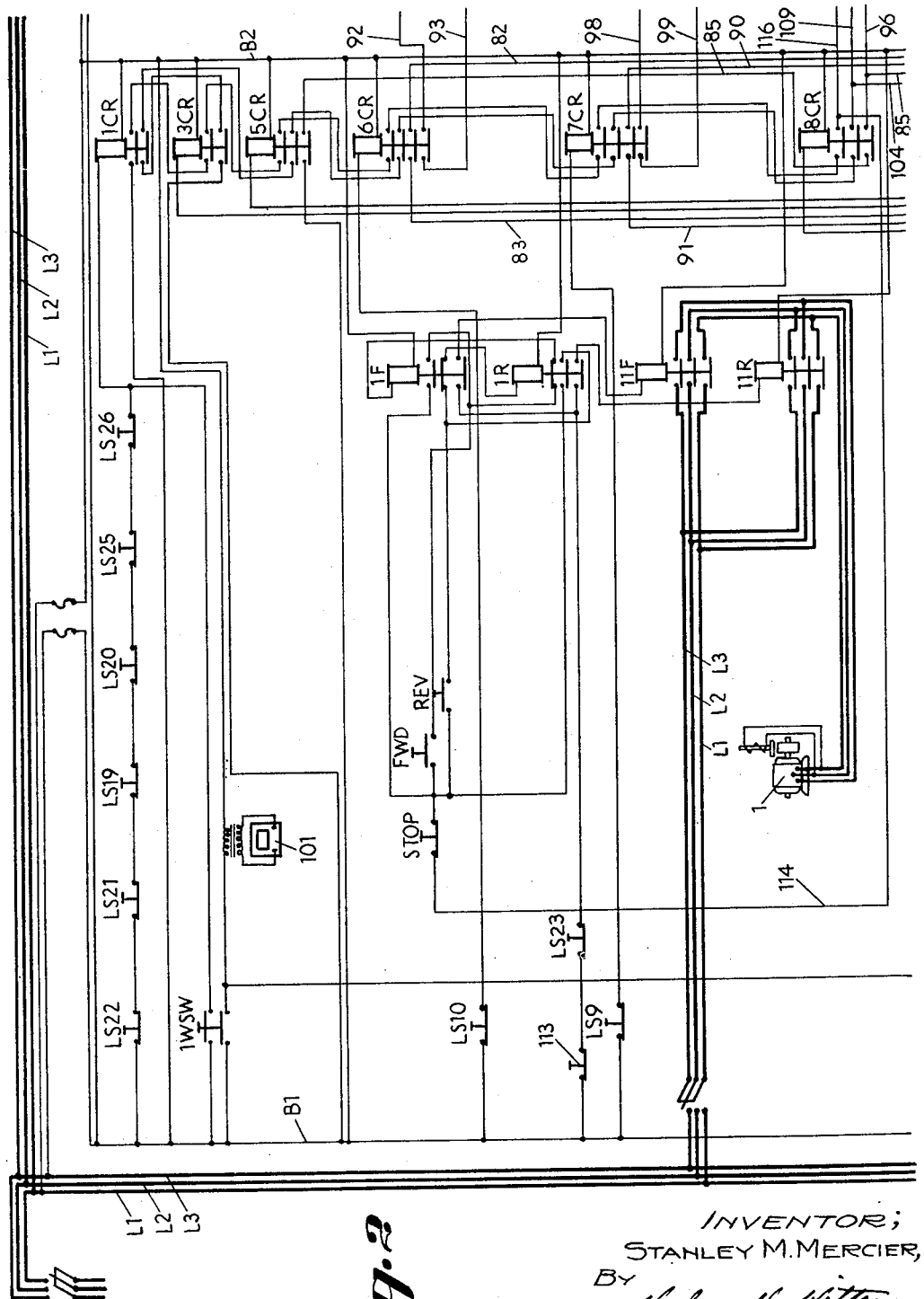

Figs. 2 to 9, inclusive, go together to make up a wiring diagram of one form of the control system embodying my invention, the complete system being illustrated by turning all the sheets of drawings sidewise and placing the even numbered drawings, one above the other, in numerical sequence, and the odd numbered drawings, one above the other, in numerical sequence, with the odd numbered drawings on the right hand side. The series starts with Figs. 2 and 3 in lateral alignment; and Fig. 10 is a piping diagram of the hydraulic system provided for controlling the head section of the trailing conveyer.

This application is a division of my application Serial No. 185,425, filed September 18, 1950, for Control Mechanism for a Stacker-Conveyer System, now Patent No. 2,734,642, issued February 14, 1956.

THE CONVEYER SYSTEM AND CERTAIN STRUCTURAL PARTS THEREOF

Referring first to Fig. 1 of the drawings there is illustrated a stacker-conveyer system incorporating features of my invention which includes a stacker 20 having a boom S2 which at its rear end is pivotally connected to the front of the head section of a trailing conveyer or what may be called a mobile conveyer designated S1. The trailing or mobile conveyer S1 is fed by a dump conveyer D1 preferably through a feed hopper 21 having the construction disclosed in Patent No. 2,554,077, granted May 22, 1951, to Gust Weggum.

The dump conveyer D1 is preferably fed by a main line conveyer M2 which as illustrated in the drawings is in turn fed by a main line conveyer M1. The general arrangement of the stacker 20 and the head section of the trailing conveyer as well as a number of the structural features of the trailing conveyer preferably follow the disclosure of my application, Serial No. 145,501, filed February 21, 1950, now Patent No. 2,684,750, issued July 27, 1954, and my application, Serial No. 215,499, filed March 14, 1951, now Patent No. 2,642,984, dated June 23, 1953.

In addition to the structural features disclosed in said application there are certain structural features disclosed in Figs. 1b and 1c of the drawings which are significant in connection with the control system herein claimed. In Figs. 1b and 1c there is shown the front of the head section of the trailing conveyer S1 including the head pulley 22 and associated conveyer belt 23. As previously mentioned, the rear end of the stacker boom S2 is supported from the front end of the trailing conveyer head section S1 for swinging movement about an upright axis. This is effected by mechanism disclosed in detail in my application, Serial No. 145,501, part of which is also shown in Figs. 1b and 1c. This supporting mechanism includes a circular turntable supporting frame 24 having a pair of side brackets 25 by which it is pivotally mounted on the front end of the frame of the conveyer S1 by pivot means 26 which supports the frame 24 for swinging movement on a normally horizontal transversely extending axis. Hydraulic cylinder or jack adjusting means 27 interconnects the rear of the frame 24 and the frame of conveyer S1 for swinging movement of said frame 24 on said transverse axis.

Mounted for rotation relative to the frame 24 in a generally horizontal plane is a bull ring 28 which is provided with spaced rollers, disclosed in more detail in application, Serial No. 145,501, which bull ring is rigidly attached to the rear end of the stacker boom S2, as also disclosed more in detail in said application, Serial No. 145,501.

Of significance to the invention of this application is the fact that the bull ring 28 carries a limit switch operating cam 29 which, as illustrated in Fig. 1b of the drawings, is positioned as it would be with the stacker 20 extending straight forward in longitudinal alignment with the axis of the trailing conveyer section S1, as it is seen in Fig. 1a of the drawings. The frame 24 carries a pair of limit switches designated LS9 and LS10, respectively, there being one on each side of said frame 24, as clearly illustrated in Fig. 1b of the drawings. These limit switches LS9 and LS10 are adjustably mounted on supporting brackets 30 which constitute part of the frame 24, providing for adjustment of their positions so that they may be actuated by varying angular swinging movement of the boom S2 from its straight-ahead position. The functions performed by the switches LS9 and LS10 are described in connection with the wiring diagram.

As illustrated in Fig. 1a of the drawings, the head section 211 of trailing conveyer S1 is positioned above the rails of a track 219 and is supported entirely independently thereof, with the trailing portion of said trailing conveyer S1 being pulled along said rails 219 as the trailing conveyer S1 advances forwardly, between which intermittent forward movements the boom S2 swings through a desired arc to discharge dirt.

The frame 224 of head section S1 includes a pair of bolster and axle or axle frame assemblies 225 and 226 which are of similar construction, except for differences hereinafter mentioned. As clearly illustrated in Fig. 1d of the drawings, at the front end of the trailing conveyer head section 211 there is a bolster 227 comprising a transversely extending boxlike member built up of plates and angles welded together, as illustrated in Fig. 1g of the drawings. The bolster 227 carries a leveling device 228 responsive to the transverse level of the head section 211, which device may be the leveling device shown and described in my abandoned application Serial No. 124,190, filed October 28, 1949, hereinafter referred to in more detail.

Adjacent the transverse center of the frame 224 the bolster 227 is provided with a heavy downwardly extending pivot or king pin 229 rigidly attached to the bolster 227 and providing a pivotal and sliding connection with a trunnion 230 (see Fig. 1g) which provides a pivotal connection to the axle or axle frame 225 through forward and rearward cooperating bearings 231, this pivotal connection being along the longitudinal axis of the trailing conveyer head section 211 and being substantially horizontal.

As clearly illustrated in Fig. 1g, the bottom of king pin 229 is journaled on an upright axis in the trunnion 230 so as to provide for relative swinging movement between frame 224 and the center of said axle 225. Furthermore, this pivotal connection provides for limited relative up and down or vertical movement between the king pin 229 and the trunnion 230 by virtue of the fact that the vertical dimension of the trunnion 230 at the pivot connection is less than the distance between top and bottom limit plates 232 and 233 carried by this interconnecting portion of said king pin 229 and trunnion 230. This vertical movement is provided so that under normal conditions the load on the front portion of head section 211 will be transmitted to the front axle or axle frame 225 through tilted controlling jacks 64 (see Fig. 1d). The rear axle or axle frame 226 preferably receives its load from the conveyer head section frame 224 directly through the rear king pin which is similar to king pin 229.

Extending upwardly from the central portion of the trunnion 230 is a cylindrical sleeve 235 to which a strap 236 is removably attached. The strap 236 carries control switches LS13 and LS14 having projecting operating levers adapted to be operated by angle brackets 239 carried by the axle frame 225. Angle brackets 239 are adapted to operate the switches LS13 and LS14 selectively in any case where the relative tilt or angular movement of frame 224 with respect to the axle 225 on the longitudinal horizontal axis of trunnion 230 reaches a predetermined angle on either side of the right angle relation, as suggested by Fig. 1f of the drawings.

Above the strap 236 the sleeve 235 carries a disk-like plate 240 which on one side is provided with an adjustable projecting finger 241 (see Fig. 1f) adapted selectively to operate forward switches LS11 and LS12 carried by bolster 227, said switches LS11 and LS12 having operating levers adapted to be selectively operated by the finger 241 whenever the front axle frame 225 rotates in either of opposite directions through a predetermined angle from a position transversely of the longitudinal axis of the head section 211.

Figure 1E:
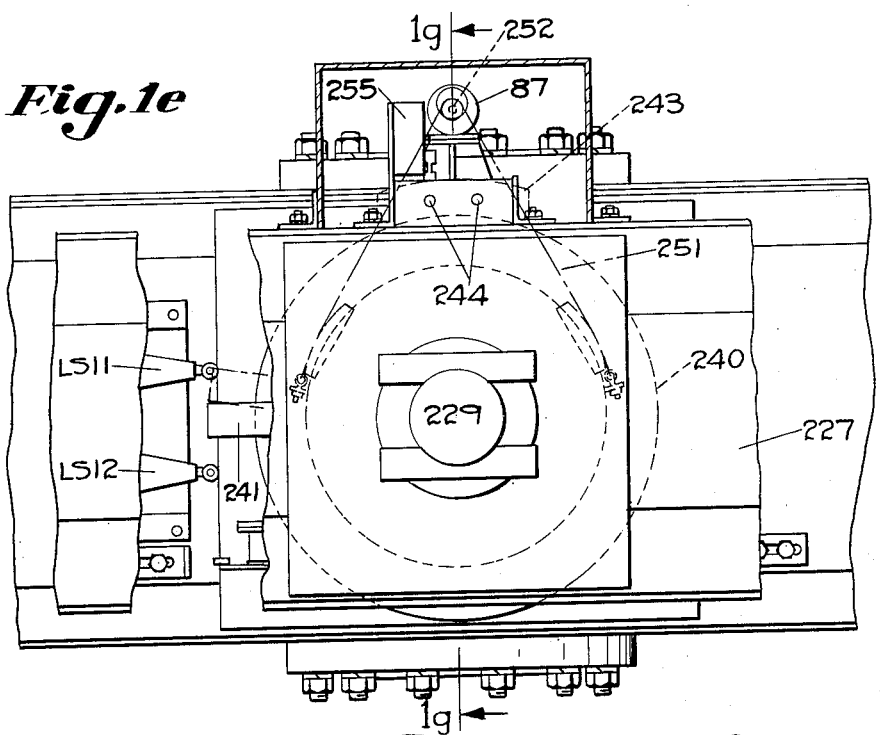
Fig. 1e is a plan view, with parts omitted, parts broken away and the other parts in section showing particularly the connection between the trailing conveyer head section frame and the front axle or axle assembly.
Figure 1F:
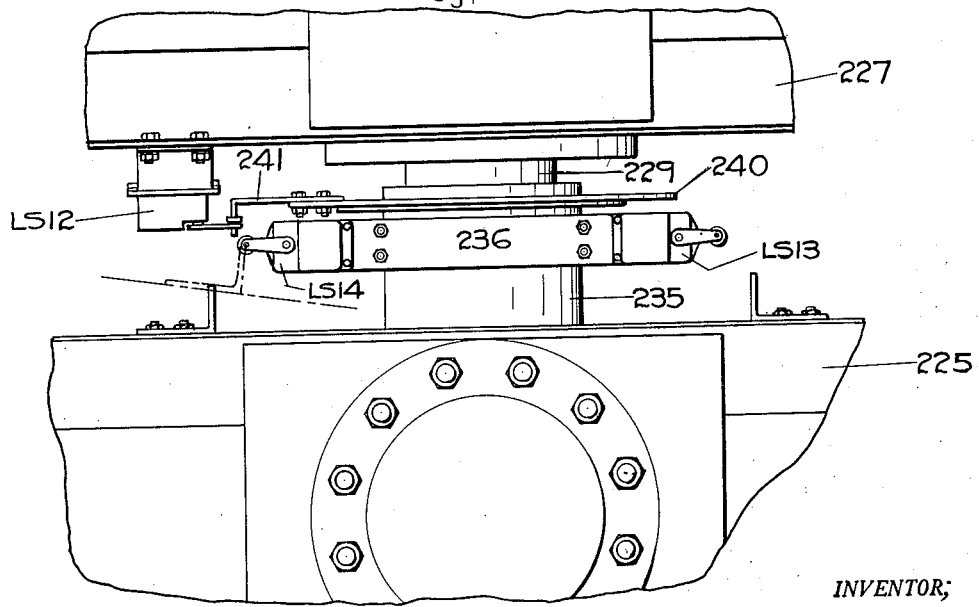
Fig. 1f is a front elevational view of the structure seen in 1e.

The disk or plate 240 carries a rearwardly extending projecting plate 243 (Figs. 1e and 1g) adapted to abut the bottoms of a pair of spaced upright rods 244 mounted in side by side relation (see Fig. 1e) and which are mounted for vertical sliding movement by means clearly indicated in Fig. 1g of the drawings. Spring means 248 cooperate with the rods 244 to maintain their bottoms in contact with the plate 243.

Adjacent the bottoms of these rods 244 there is a bracket 249 rigidly attached to said rods, upon which a Selsyn transmitter 87 is mounted. The rotor of transmitter 87 is operated by a cable 251, the opposite ends of which are attached to the plate 240 (see Fig. 1e), which cable drives a pulley 252 keyed to the rotor shaft of transmitter 87. Angular movement of the axle assembly 225 about the upright axis of the king pin 229 therefore produces rotary motion of the rotor of transmitter 87 which is part of a telematic system, the receiver of which may be located adjacent an operator's station thereby indicating the angular position of the front axle 225 relative to a true transverse position.

One of the rods 244 is also provided with a pair of stops 253 which operate lever operated switches LS35 and LS36 (Fig. 1g) carried by a bracket 255 (Fig. 1e) attached to bolster 227. In case the king pin 229 moves to its lowermost position, as illustrated in Fig. 1g, the upper control switch LS35 will be actuated. Should said king pin 229 be elevated to its uppermost position relative to the trunnion 230 the lower switch LS36 will be operated.

The structure shown in Figs. 1d, 1e, 1f and 1g of the drawings and briefly described herein is shown and described in full detail in my copending application Serial No. 215,499, filed March 14, 1951, for a Conveyer Apparatus and Supporting Mechanism Therefor, now Patent No. 2,642,984, dated June 23, 1953, which application is a division of my application Serial No. 145,501, above identified, which latter application is hereinafter further referred to.

The structure shown in Fig. 1h and Fig. 1i includes one of the tell-tale devices carried by the main frame 224 of head section 211 of trailing conveyer S1 (see Fig. 1) for controlling the operation of the crawler motors of the trailing conveyer S1 in a manner more fully described hereinafter. This structure is described in full detail in my abandoned application Serial No. 145,502, filed February 21, 1950, for a Self-Propelled Conveyer Unit with Tell-Tale Steering Mechanism, and, therefore, is described only briefly here.

The main frame 224 of head section 211 of trailing conveyer S1 carries a pair of tell-tale devices 317 and 318, one adjacent the front bolster and axle assembly 225 and the other adjacent the rear bolster and axle assembly 226 as indicated diagrammatically in Fig. 1 of the drawings. Since the tell-tale devices 317 and 318 are of the same construction it will suffice to describe tell-tale device 318. Said tell-tale device 318 includes a generally rectangular frame 319 pivotally mounted to the main frame 224 for adjustment on a transverse horizontal axis by a pivot means 320. The frame 319 includes a pair of similar side panel members and interconnecting cross and diagonal members including a pair of parallel cross shafts 321 and 322.

Slidable laterally of the main frame 224 and longitudinally of the axis of shafts 321 and 322 is a slide unit 323 including a pair of spaced upstanding side plates, between which there is a double flanged guide wheel 324 journaled on a cross thimble which is rigidly attached to the side plates of said slide unit 323 and which slides on the shaft 322. Said slide unit 323 also includes a switch actuating block 325 rigidly attached to a thimble which extends between said side plates of the slide unit 323 which slides along the shaft 321. The double flanged guide wheel 324 is adapted to ride on one of the rails 219 and shift the slide unit 323 laterally of the frames 224 and relative to the frame 319 of the tell-tale device 318 as dictated by the relative lateral position of the main frame 224 and the rail 219 at the tell-tale location.

Figure 1H:
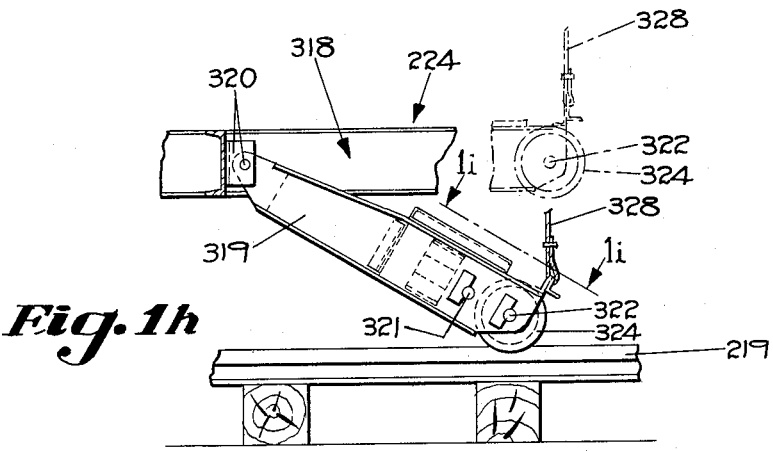
Fig. 1h is a side elevational view showing a tell-tale device which actuates control switches on the trailing conveyer head section frame.
Figure 1I:
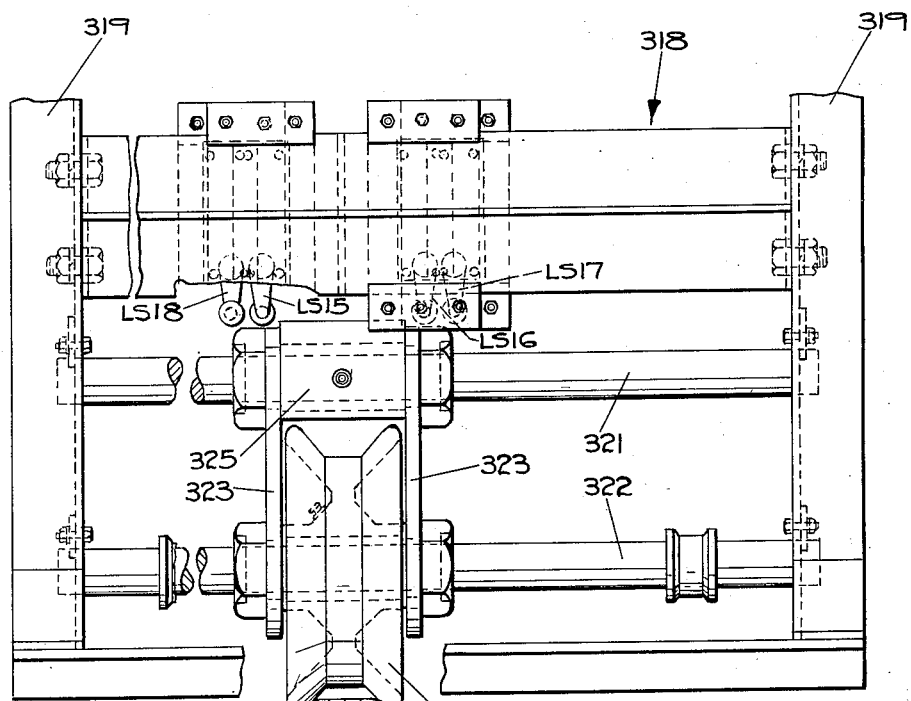
Fig. 1i is a view of the tell-tale device, the view being taken substantially on line 1i—1i of Fig. 1h, the view showing particularly control switches actuated by the tell-tale device.

The tell-tale frame 319 also carries a pair of laterally spaced lower switches LS15 and LS16 having operating levers normally extending on opposite sides of the operating block 325 and adapted to be selectively operated thereby as the block 325 is moved laterally from its normal or neutral position, as illustrated in Fig. 1i of the drawings. There is a second pair of upper control switches LS17 and LS18 which are spaced on opposite sides of the block 325, the operating levers of which are laterally outwardly of the operating levers of the switches LS15 and LS16 as illustrated in Fig. 1i of the drawings. The switches LS17 and LS18 are operated when, and only when, the block 325 is moved laterally in one direction or another a greater extent than is required to operate a switch LS15 or LS16.

As illustrated in Fig. 1h, a cable 328 is preferably provided so that the tell-tale device 318 may be lifted from the rail 219, in which instance the automatic or tell-tale control of the steering is eliminated.

WIRING DIAGRAM—GENERAL

Figs. 2 to 9, inclusive, of the drawings, when placed as above indicated, disclose the essential portion of the wiring system including features of my invention. In general three-phase power is supplied for the various motors and single phase power is supplied for the various control relays, solenoids, etc. The three-phase power is provided by means of three power lines L1, L2 and L3 which are connected to a primary source of power through a disconnect switch, as illustrated in Fig. 2 of the drawings. Single phase control voltage is delivered to the various relays, solenoids, etc., by means of parallel buss bars or control lines B1, B2 (Figs. 2, 4, 6 and 8), B3 and B4 (Figs. 3, 5, 7 and 9).

Figure 5:
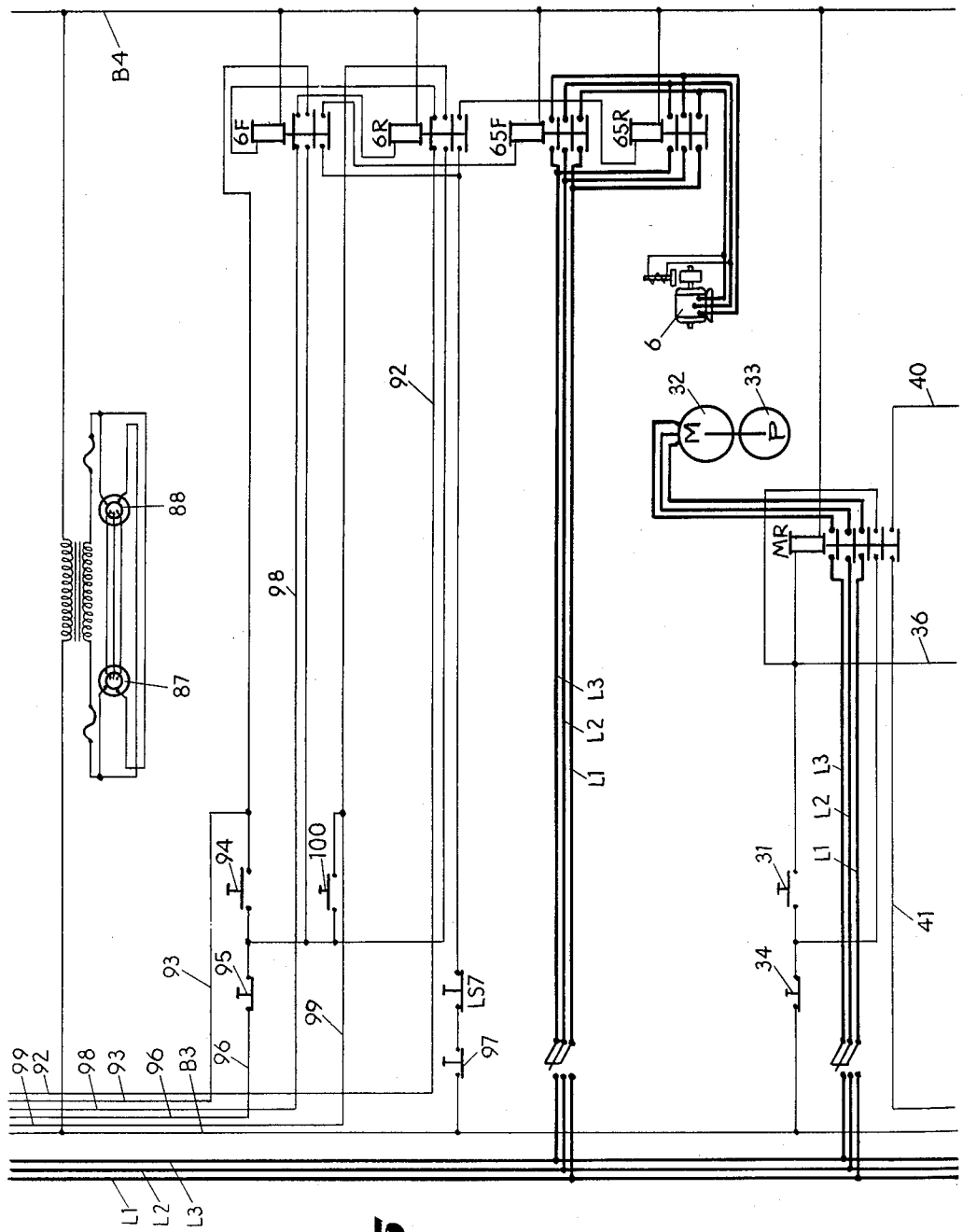

To place the stacker-conveyer in operation the first thing that is done is to close the normally open push button start switch 31 seen on Fig. 5 of the drawings. This energizes relay MR over an obvious circuit. Relay MR upon energizing closes the circuit to motor 32 which is energized from lines L1, L2 and L3 through a manual disconnect switch which will, of course, be closed when the unit is in operation. Motor 32 drives the hydraulic pump 33 of the hydraulic system which is disclosed in Fig. 10 of the drawings.

Figure 7:
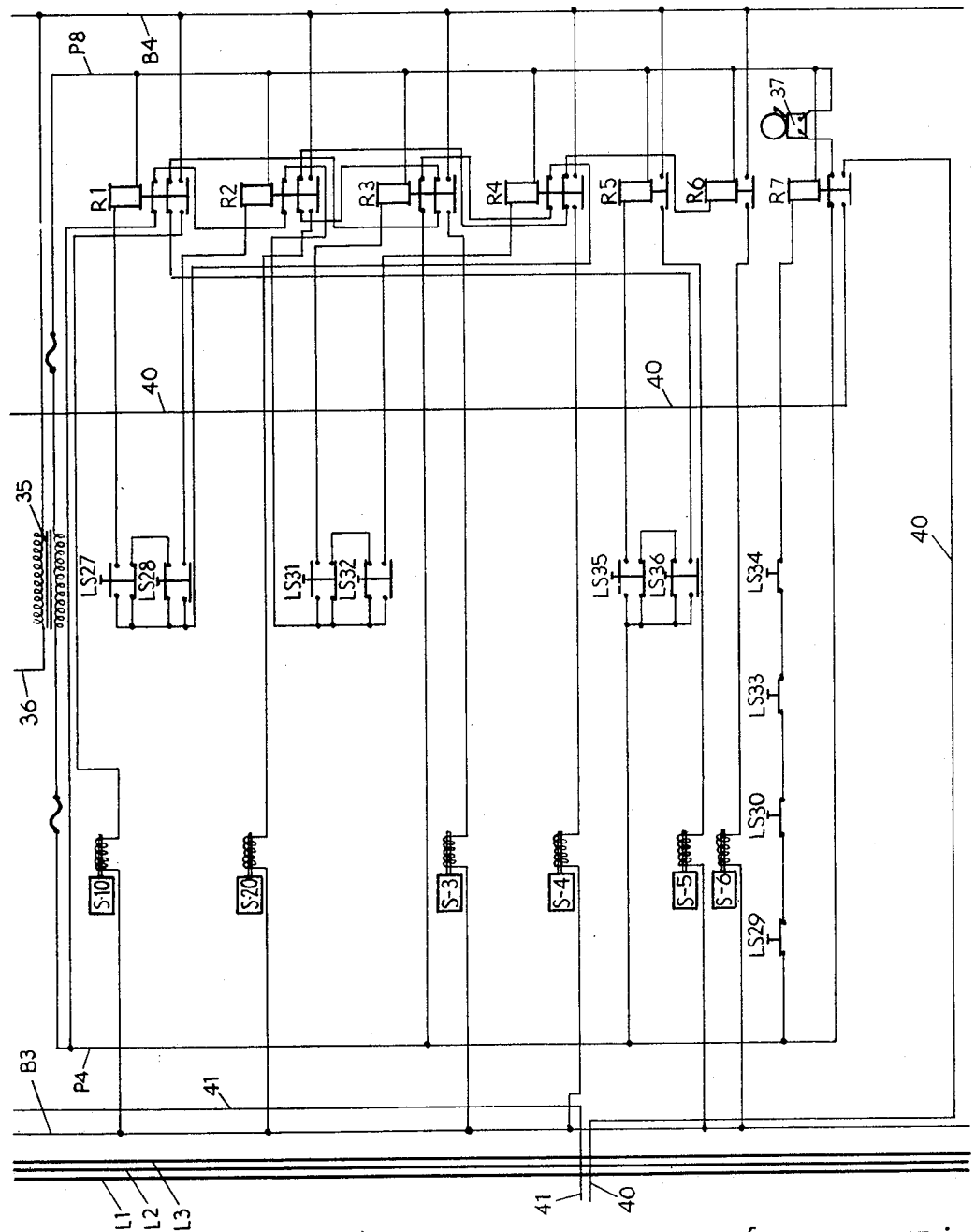

The fourth contact of the relay MR closes an obvious hold-in circuit therefor through normally closed stop switch 34. It also closes a circuit through said normally closed stop switch 34 to the primary of a transformer 35 (see top of Fig. 7) by way of a branch line or conductor 36. The secondary of transformer 35 leads to and thus energizes lines P4 and P8 (Fig. 7). The bottom contacts of the relay MR control circuits which will be described hereinafter.

Upon the energization of lines P4 and P8 (Fig. 7) relay R7 will be immediately energized, providing normally closed switches LS29, LS30, LS33 and LS34 are closed. LS29 and LS30 are the "high" and "low" control switches, respectively, in the transverse level control unit 228 mounted on the front transverse bolster 227 of the head section 211 of the trailing conveyer S1 (see Fig. 1d). These switches correspond, for example, to the switches 54 and 55 seen in Fig. 5 of the drawings of my application, Serial No. 124,190, filed October 28, 1949, and now abandoned. They are both normally closed so long as the head section of the trailing conveyer, and consequently the stacker boom S2, are transversely level within the limits of the leveling apparatus 228.

Switches LS33 and LS34 are the "high" and "low" switches, respectively, of the leveling device on the turntable 24, such leveling device being shown, for example, at 212 in Fig. 1c of the drawings. These switches are normally closed so long as said turntable 24 is level along a plane extending longitudinally of the trailing conveyer head section S1. In other words, if the stacker boom and the turntable, as well as the head section of the trailing conveyer, are level, relay R7 will operate. If not, one of the switches LS29 or LS30 in leveling device 212 or one of the switches LS33 or LS34 in leveling device 228 will be open, in which case relay R7 will not be energized when lines P4 and P8 are energized, in which case a bell or buzzer 37 (see Fig. 7) located in the operator's cab will be energized, indicating that one of said switches is open.

START AND CONTROL OF CONVEYER BELTS

With relays MR (Fig. 5) and R7 (Fig. 7) closed we are now ready to start the belt of the stacker 20 by energizing the belt driving motor 8 thereof. Relay S2S (Fig. 6) is energized by closing the start switch 38 which closes the circuit through said relay which extends from energized line B2 to energized line B1 as follows: One side of the solenoid or coil of relay S2S is directly connected to line B2. The other side extends over an obvious conductor to switch 38, which is now closed, through normally closed stop switch 39 to conductor 40 which extends through the lower contacts of relay R7 (Fig. 7), then upwardly through the lower contacts of relay MR (Fig. 5). The continuation of the circuit through the lower contacts of relay MR is by conductor 41 (Fig. 5) which extends to Fig. 7 and thence to Fig. 6 through the normally closed contacts of a maintenance switch 42, thence through the normally closed contacts of an emergency stop switch 43 to the line B1. It may be stated that the emergency stop switch 43 is on the belt gangway of the boom S2 so that it can be operated to stop the belt by an operator or repairman who may be working on said gangway. The maintenance switch 42 will remain in whichever position it is thrown, but normally is in the position illustrated in Fig. 6 of the drawings.

It is obvious from the above description that conductors 40 and 41 are effectively connected together when and only when both relays MR (Fig. 5) and R7 (Fig. 7) are energized. Relay S2S on energizing closes a hold-in circuit through its upper contacts which by-passes the start switch 38 but includes the rest of the energizing circuit above described. At its second contacts relay S2S energizes relay S21 (Fig. 6), one side of the said second contacts being connected directly to line B1, the other side extending through a somewhat circuitous path to the coil of relay S21, the other side of said coil extending directly to line B2. The upper contacts of relay S21 provide a hold-in circuit therefor which extends through the second contacts of relay S2S or the second contacts of relay S2M in parallel, one side of each of which contacts is connected with line B1. Relay S21 will therefore be energized whenever relay S2S or relay S2M is energized.

Relay S21 on being energized closes the circuit to motor 8 over its lower contacts, energy from said motor being derived over obvious conductors from the lines L1, L2 and L3 under the control of a disconnect switch. The lower contacts of the relay S2S provide an interlock between this relay which controls motor 8 of the stacker 20 with the driving motor or motors of the conveyer on the head section S1 of the trailing conveyer. The relay S2S may be de-energized and thus stop the motor 8 by opening the normally closed stop switch 39 which would de-energize it and also de-energize relay S21 unless the relay S2M is energized, as now to be described.

In case it is desired to operate the conveyer belt of the boom, or, in other words, to drive the motor 8 without starting the entire system, for example, for maintenance purposes, start switch 44 is closed (Fig. 6) which energizes relay S2M, one side of which is connected directly to line B2, the circuit extending from switch 44 through the normally closed contacts of "inch" switch 45, the normally closed contacts of stop switch 46, the normally open contacts of maintenance switch 42 which are now closed, and the normally closed contacts of emergency switch 43 to line B1. The upper contacts of relay S2M provide a hold-in circuit which by-passes the start switch 44, the circuit otherwise being the same as above described. The second contacts of relay S2M are in parallel with the second contacts of relay S2S and consequently energize relay S21 in substantially the same way it was energized by said second contacts of relay S2S. This will start the motor 8 and maintain it in operation until stop switch 46 is opened to drop out relays S2M and S21.

It is also possible to energize relay S21 momentarily, and thus energize the motor 8 momentarily to "inch" it along for repair or inspection purposes by controlling the said relay S21 direct. This is effected by closing the normally open contacts of "inch" switch 45 which extends the line B1 through switches 43, now closed but normally open contacts of maintenance switch 42, normally closed stop switch 46, and the lower normally open but now closed contacts of "inch" switch 45 to one side of the coil of relay S21, the other side being permanently and directly connected to line B2. Relay S21 will be energized under these circumstances only so long as the "inch" switch 45 is held with its lower contacts closed. It is, of course, evident that relay S21 controls motor 8 direct, and motor 8 will always run when relay S21 is energized, providing its disconnect switch is closed and there is power on the lines L1, L2 and L3.

As previously mentioned, the lower contacts of relay S2S (Fig. 6) provide an interlock requiring that this relay be energized and thus the belt of the stacker 20 be in operation before the belt 23 of the trailing conveyer can be started. The lower contacts of said relay S2S upon closing energize relay S1S (Fig. 8), one side of which is connected directly to line B2, the other side of which extends through normally closed contacts of a maintenance switch 47 which will stay in any position to which it is adjusted, the circuit extending through the normally closed contacts of emergency stop switch 48 to the line B1. Emergency stop switch 48 is available to an operator or maintenance man on the head section S1.

Relay S1S (Fig. 8) on energizing energizes relay S1A over an obvious circuit through its upper contacts. Relay S1A in turn energizes relay S11 over an obvious circuit. Relay S11 upon energizing energizes motors 9 and 10 or either of them alone, assuming their common disconnect switch is closed. If their individual disconnect switches are both closed both motors 9 and 10 will energize. If either of said individual disconnect switches is open, of course, the particular motor disconnected will not be energized. The two motors 9 and 10 are preferably provided for driving the belt 23. In practice one of them has been made a 125 horsepower motor, the other a 30 horsepower motor.

For maintenance purposes the maintenance switch 47 is switched from the position illustrated to one in which its lower contacts are closed. Under these circumstances relay S1M may be energized independently of relay S1S by closing the normally open start switch 49. Relay S1M has a hold-in circuit which by-passes the start switch 49 and extends through its upper contacts. Its lower contacts energize S1A over an obvious circuit. It may be de-energized by opening the normally closed stop switch 50. An "inch" switch 51 is provided similar in function to the "inch" switch 45, except, of course, it controls motors 9 and 10, while the "inch" switch 45 controls motor 8.

Figure 6:
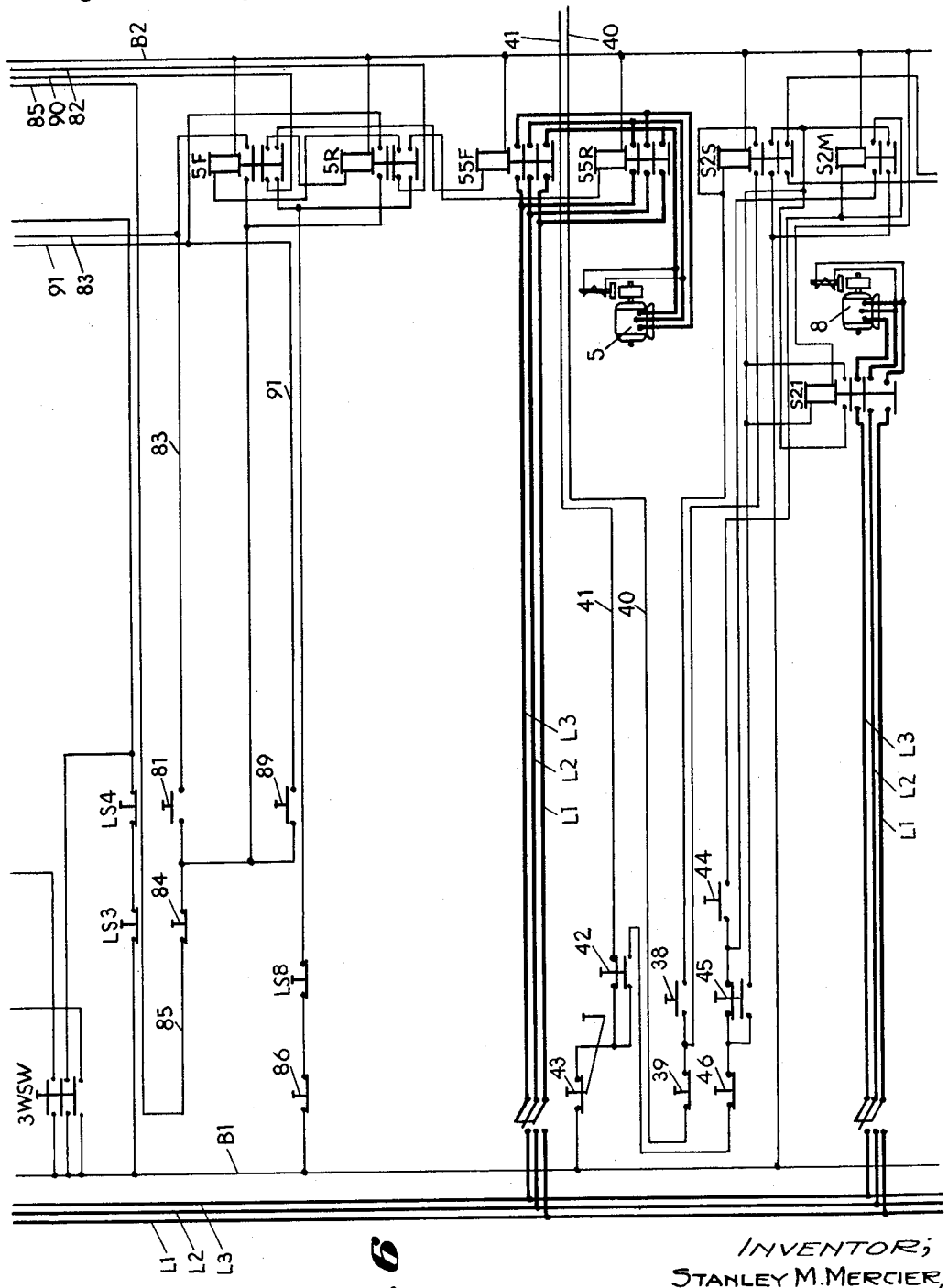
Figure 8:
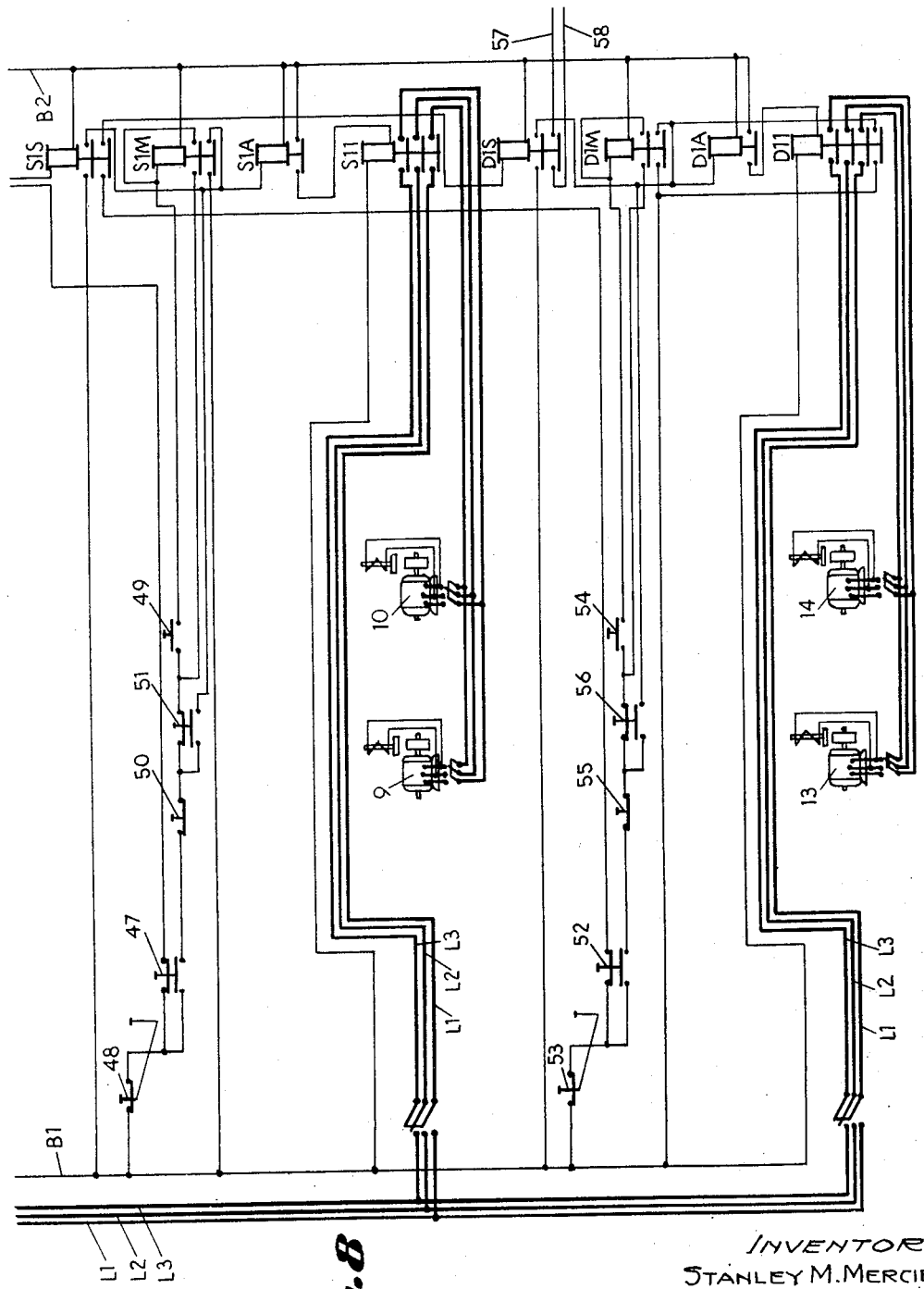

When the normally open contacts of "inch" switch 51 are closed and the maintenance switch is in the maintenance position relay S1A will be energized over an obvious circuit so long as "inch" switch 51 is maintained closed, it, like "inch" switch 45, being the push button type and biased to the positions illustrated in Figs. 6 and 8 of the drawings. Relay S1A when energized energizes relay S11 which controls the motors 9 and/or 10 as above set forth.

The lower contacts of relay S1S (Fig. 8) provide the interlock to insure that the motors of the dump conveyer D1 start after the trailing conveyer S1 has been started. Said lower contacts of relay S1S energize relay D1S, one side of which is connected to the line B2, the other side extending through maintenance switch 52 and emergency stop switch 53 to the line B1. The upper contacts of relay D1S on closing energize relay D1A over an obvious circuit, the lower contacts extending the interlock to subsequent controls, as hereinafter described.

Relay D1A energizes relay D11 over an obvious circuit which in turn energizes the motors 13 and/or 14 in a manner obvious from the above description of the operation of motors 9 and 10. Motors 13 and 14 are the driving motors for the dump conveyer D1. In addition to the automatic interlock control of these motors, as above described, they may be operated individually and continuously by reversing the maintenance switch 52 and controlling the relay D1M through its start switch 54 and its normally closed stop switch 55, said relay D1M being provided with upper hold-in contacts which by-pass the start switch 54. The lower contacts of relay D1M energize relay D1A which in turn energize relay D11 to energize motors 13 and 14.

The "inch" control for the motors 13 and 14 is provided by "inch" switch 56 which energizes D1A direct so long as said "inch" switch 56 is closed and the maintenance switch 52 is in the maintenance position. The maintenance and "inch" controls for the relays D1A and D11 are substantially the same as those above described for relays S1A and S11.

Figure 9:
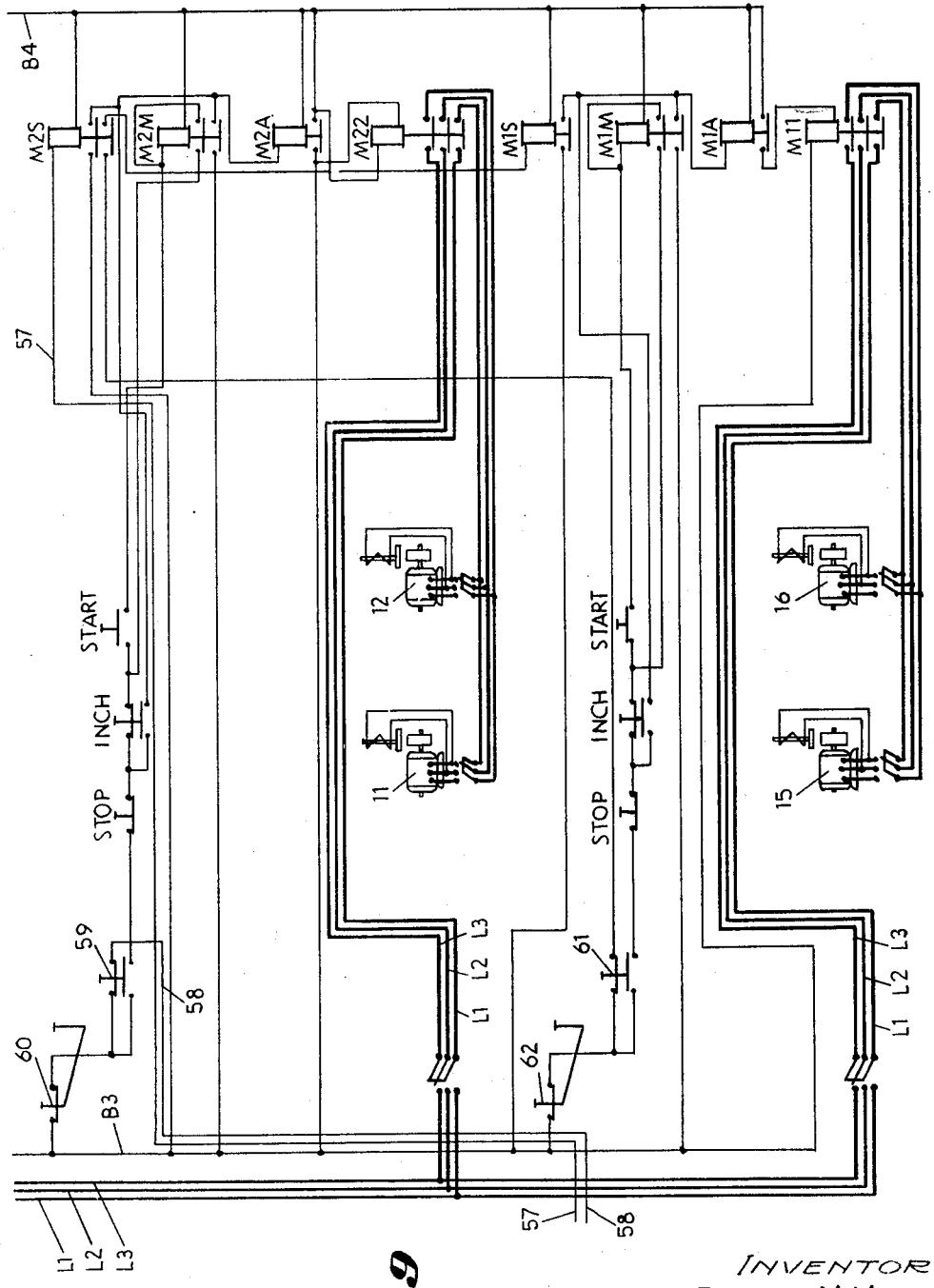
Figure 10:
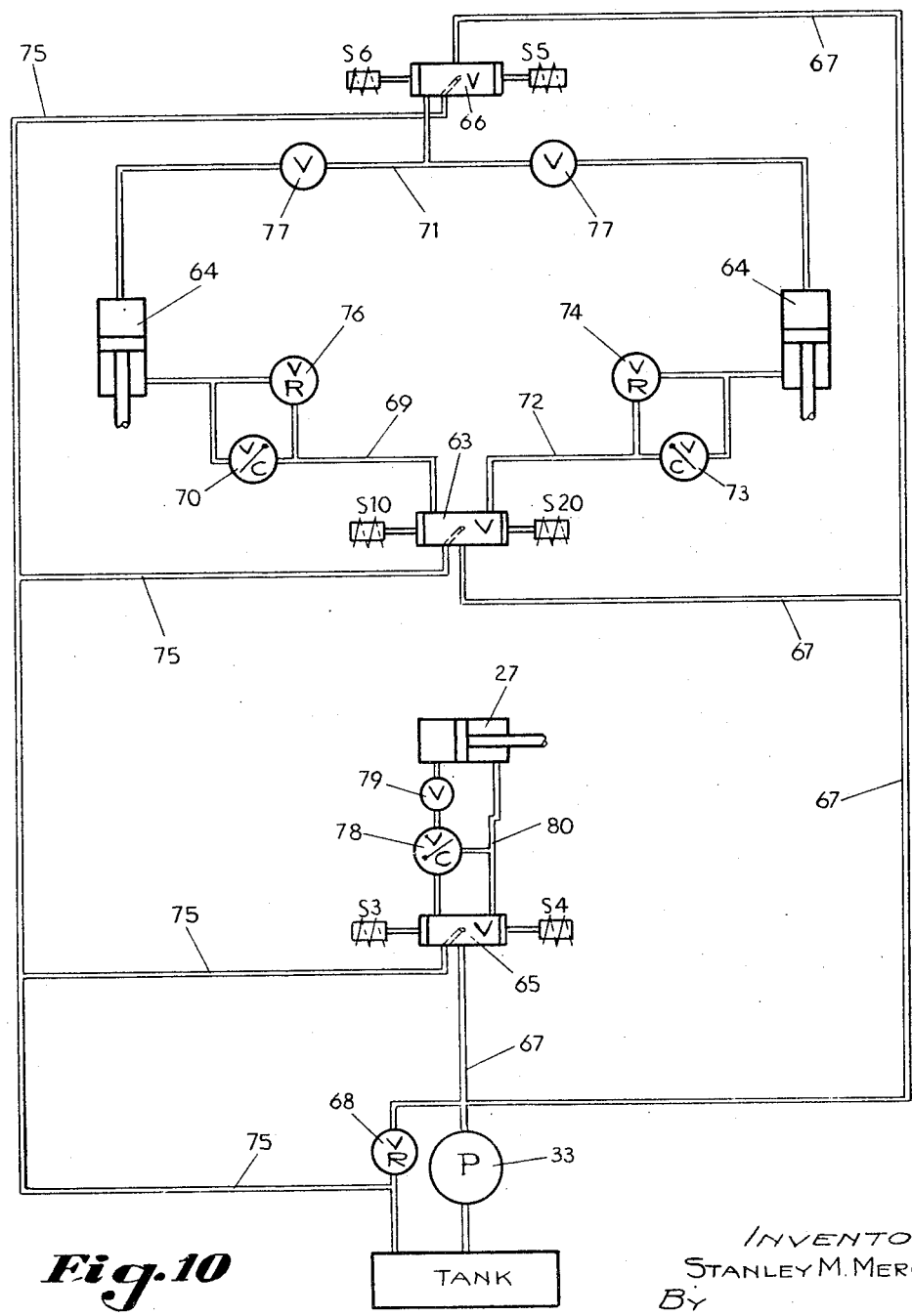

As above mentioned, the lower contacts of relay D1S (Fig. 8) provides the interlock with the controls for the motors 11 and 12 on the main line conveyer M2, said lower contacts controlling conductors 57 and 58 which extend to Fig. 9, the first leading to relay M2S, the other to the normally closed contacts of maintenance switch 59 and then to line B3 through emergency stop switch 60. One side of relay M2S is connected directly to the line B4. At its upper contacts relay M2S energizes relay M2A over an obvious circuit. Relay M2S at its lower contacts provides interlock to the driving motors 15 and 16 of main line conveyor M1, as hereinafter described.

Relay M2A on energizing energizes relay M22 which controls the motors 11 and/or 12 in a manner obvious from the above description of the control of motors 9 and 10, 13 and 14. Maintenance control relay M2M with its hold-in circuit is provided to control relay M2A and relay M2A may be directly controlled through an "inch" switch, the control being obvious in view of the above description of the operation of maintenance relays S1M and D1M.

The lower contacts of relay M2S upon energizing will energize relay M1S over an obvious circuit which includes the normally closed contacts of maintenance switch 61 and the normally closed contacts of emergency switch 62. Relay M1S on energizing energizes relay M1A over an obvious circuit which in turn energizes relay M11 over an obvious circuit which connects M1 conveyer drive motors 15 and/or 16 to the power lines L1, L2 and L3. Relay M1A may be controlled by the maintenance relay M1M provided with a hold circuit and controlled through the maintenance switch 61 and appropriate start and stop switches in a manner which is obvious in view of the above description of the control for maintenance relays S1M and D1M. Likewise, relay M1A may be controlled direct by an "inch" switch, the control being obvious in view of the above description of the mode of operation of "inch" switches 51 and 56.

From the above description it is obvious that the driving motors for the conveyers M1, M2, D1, S1 and 20 are all interlocked and during the normal operation they can only be started in the proper sequence, with each leading belt starting before a trailing belt starts. Furthermore, if any leading belt stops, all subsequent belts will stop, while all preceding belts will continue to run. Provision is made, however, in each instance for a maintenance operation of each belt independently of each other belt, but this is only a temporary condition, and the switches are so thrown that during normal operation the interlock is provided. "Inching" operation is also provided for each belt; that is, it may be "inched" or driven forward for a short distance only so long as a push button or other switch is maintained closed. This provides great flexibility of operation of the system and one in which during normal working operations the several conveyors, one feeding the other, are interlocked so that in case of any breakdown and stoppage of any belt those belts which feed it will be automatically stopped while those belts that feed from it will continue to operate and discharge material. This will prevent any building up of material on a belt in case any such belt should be stopped during operation.

It may be stated that in the interest of simplifying what is inherently a complicated circuit any overload protecting devices and signals which are not essential features or parts of the invention herein claimed have not been illustrated in the wiring diagram.

With the electrical system operated as above described the system will be in that condition wherein all of the belts or conveyers are running and it is ready to receive material any place along the main line conveyer and discharge it over the head or discharge end of the stacker 20. In other words, the conveyer system is in operation and material may be fed to the main line conveyer, such as the main line conveyer M1, in any desired manner.

LEVEL PROTECTIVE CIRCUIT

As previously described, the limit switches LS29, LS30, LS33, LS34 (Fig. 7) are normally closed so long as the head section S1 and the turntable 24 are level. Should either become out of level in either direction and any of said switches open, relay R7 (Fig. 7) will be de-energized which will sound the alarm 37 in the cab and which at its lower contacts will break the hold-in circuit for relay S2S (Fig. 6), thus de-energizing it. Relay S2S on de-energizing will de-energize the entire system and stop all of the conveyer motors since the energization of all of these motors is dependent upon the energization of relay S2S. If this condition occurs it will be necessary to level the apparatus so that all of the switches LS29, LS30, LS33 and LS34 (Fig. 7) are closed, whereupon the belts can be started up again only by a manual operation involving the closing of start switch 38 (Fig. 6) which will re-energize relay S2S, starting up the conveyer motors in sequence as above described.

LEVEL CONTROL SWITCHES AND VALVES ACTUATED THEREBY

As previously described, limit switches LS29 and LS30 (Fig. 7) are actuated by a leveling instrument 228 (Fig. 1d) on the front bolster 227 of the head section S1. There is another and similar level measuring device, not shown, mounted thereon, which follows the construction of the device 228 and 26 of my said abandoned application, Serial No. 124,190, which includes a "high" limit switch LS27 (Fig. 7) and a "low" limit switch LS28. Limit switches LS27 and LS28 are adjusted so that they respond to a lesser tilting of said bolster to actuate them than is required to actuate the corresponding limit switches LS29 and LS30 respectively.

As also previously described, limit switches LS33 and LS34 are actuated by the leveling instrument 212 on the turntable 24 (Fig. 1c). There is another and similar level measuring device mounted thereon which also follows the construction of the device 212 and the device 26 of my said abandoned application, Serial No. 124,190, which includes a "high" limit switch LS31 and a "low" limit switch LS32. Limit switches LS31 and LS32 are adjusted so that they respond to a lesser tilting of said turntable 24 to actuate them than is required to actuate the corresponding limit switches LS33 and LS34, respectively. In other words, limit switches LS27, LS28, LS31 and LS32 are level correcting controlling switches, while limit switches LS29, LS30, LS33 and LS34 are level controlled protecting or shut-down limit switches.

If the head section S1 gets out of transverse level enough to close limit switch LS27 (Fig. 7) its normally open contacts will be closed and energize relay R1. One side of relay R1 is connected directly to energized line P8, the other side extending, under the conditions indicated, through the closed contacts of limit switch LS27, then over an obvious conductor to the upper normally closed contacts of relay R4, then over the upper normally closed contacts of relay R3 to the line P4.

Relay R1 on energizing energizes solenoid S10 over its lower contacts. Solenoid S10 on operating controls a four-way valve 63 (Fig. 10) to expand the left-hand leveling cylinder 64. The leveling action will continue until the switch LS27 (Fig. 7) is open to de-energize relay R1 and solenoid S10.

If the head section S1 gets out of transverse level in the opposite direction enough to close the normally open contacts of limit switch LS28 (Fig. 7), relay R2 will be energized over the normally closed upper contacts of relays R3 and R4, the circuit extending from lines P8 to P4. Relay R2 on energizing energizes solenoid S20 through its lower contacts over an obvious circuit. Solenoid S20 (Fig. 10) on being energized expands the right-hand leveling cylinder 64 which corresponds with the right-hand cylinder 56 shown in Fig. 3 of my said application, Serial No. 145,501, to correct the leveling of the head section S1.

The upper normally closed contacts of relays R1 and R2 provide an interlock between these relays and relays R3 and R4 so that neither of the relays R3 or R4 can operate while either relay R1 or R2 is in operation. Likewise, the upper normally closed contacts of relays R3 and R4 provide an interlock with relays R1 and R2 so that if either relay R3 or R4 is operated neither of the relays R1 or R2 can be operated.

If the turntable 24 becomes out of level in a direction sufficient to operate limit switch LS31, relay R3 will be energized over an obvious circuit including the normally closed upper contacts of relays R1 and R2. Upon being energized relay R3 will energize solenoid S3 over its lower contacts. Solenoid S3 upon being energized will actuate a four-way valve 65 (Fig. 10) to expand the leveling cylinder or jack 27 (Fig. 1c).

If the turntable 24 becomes out of level in the opposite direction an amount sufficient to close the normally open contacts of limit switch LS32, relay R4 will be energized over an obvious circuit including the upper normally closed contacts of relays R1 and R2. Relay R4 on being energized energizes solenoid S4 over its lower contacts. Solenoid S4 on being energized will control the four-way valve 65 (Fig. 10) so as to contract the cylinder or hydraulic jack 27.

Automatic means are provided to adjust the jacks or cylinders 64 so as to maintain the head section frame within a predetermined range of elevation with respect to said front axle. This includes the two limit switches designated LS35 and LS36 in Fig. 1g of the drawings.

As said main frame reaches such an elevation as to close the normally open contacts of limit switch LS35, relay R5 will be energized over an obvious circuit which will energize solenoid S5 over an obvious circuit. Solenoid S5 upon being energized will control a four-way valve 66 (see Fig. 10) to drain hydraulic fluid from the two leveling cylinders 64 and thus lower the frame of the head section S1 until the normally open contacts of limit switch LS35 are again opened, de-energizing relay R5 and solenoid S5.

If the said frame S1 is too low relative to the front axle the normally open contacts of limit switch LS36 will close, energizing relay R6 over an obvious circuit which includes the normally closed intermediate contacts of relays R1, R3, R2 and R4, thus insuring that relay R6 is only energized when all of said relays R1, R2, R3 and R4 are de-energized. Relay R6 upon energizing energizes solenoid S6 which will control valve 66 (Fig. 10) to deliver oil under pressure to the two cylinders 64 in parallel which will raise the frame of head section S1 until the normally open contacts of limit switch LS36 are again opened.

Attention is now directed particularly to Fig. 10 of the drawings and to the hydraulic circuit which was described in part above and which will now be described in more detail. Said hydraulic circuit includes a pump 33 which supplies hydraulic fluid under relatively high pressure to a pressure or feed line 67, also being provided with a pressure relief valve 68. When the solenoid S10 was operated as above described it functioned to deliver hydraulic fluid under pressure from the pressure line 67 to a cylinder or jack line 69 which in one branch includes a check valve 70 preventing flow of hydraulic fluid through the line 69 away from the cylinder 64, but permitting flow of said hydraulic fluid through said line 69 to said cylinder 64.

Thus when solenoid S10 is energized the leveling jack or cylinder 64 will be contracted and hydraulic fluid on the head end thereof will be forced through a line 71 to the head end of the right-hand leveling cylinder 64. Since the line 71 is blocked under these conditions by the valve 66 the hydraulic fluid will necessarily expand the right-hand leveling cylinder 64. Fluid from the piston rod side of said right-hand cylinder 64 will flow through a line 72. Since line 72 includes a check valve 73, similar to the check valve 70, this reverse flow of hydraulic fluid cannot flow through it, but it will flow through a by-pass pressure relief valve 74. A drain line 75 will drain this reverse flow of hydraulic fluid from the valve 63 to a tank associated with the pump 33.

The check valve 70 has a pressure relief valve 76 by-passing it, the function of which is to permit reverse flow of hydraulic fluid through the line 69 when the solenoid S20 is operated. The line 71 which has parallel branches from the four-way valve 66 leading to the heads of the two leveling cylinders 64 has shut-off needle valves 77 therein which are normally open but which may be closed to prevent any seepage of fluid through the valve 66 in case the unit is shut down over-night or the like.

The relief valves 74 and 76 function to prevent wind or the like creating sufficient pressure differential between the two leveling cylinders 64 to force the head section S1 out of transverse level. However, they are set so that when hydraulic fluid is delivered to one of the lines 69 or 72 they will open to permit leveling adjustment of the cylinders 64.

If the solenoid S6 is actuated as aforesaid hydraulic fluid from the pressure line 67 will be delivered to the line 71 and expand the jacks or leveling cylinders 64. If solenoid S5 is energized as aforesaid the line 71 will be connected to the drain line 75 to drain hydraulic fluid from the cylinders 64 and lower the frame S1.

If the solenoid S3 is energized as aforesaid the valve 65 will be controlled to deliver hydraulic fluid to the head end of the cylinder 27 through a pressure operated check valve 78 and a shut-off valve 79. Shut-off valve 79 may be closed overnight to prevent leakage of fluid past the valve 65 when the pump 33, for example, is idle. Check valve 78 operates to permit free flow of fluid from the pressure or feed line 67 to the head end of the cylinder 27 when solenoid S3 is energized, but normally prevents a reverse flow of fluid therethrough.

If solenoid S4 is energized hydraulic fluid will flow from the pressure line 67 through line 80 to the piston rod end of the cylinder 27. It will also supply pressure over a branch line to the check valve 78 which will open said check valve and permit the reverse flow of fluid from the cylinder 27 through the valve 65 into the drain line 75.

CONTROL OF STACKER BOOM SWINGING CRAWLERS

Limit switch LS6 (Fig. 4) is controlled by the angularity between the mast on the tractor and the boom frame. It may, for example, follow the disclosure of my Patent No. 2,632,558, dated March 24, 1953, and be in the form of the switch 41, 42, 43 or the switch 75.

Figure 3:
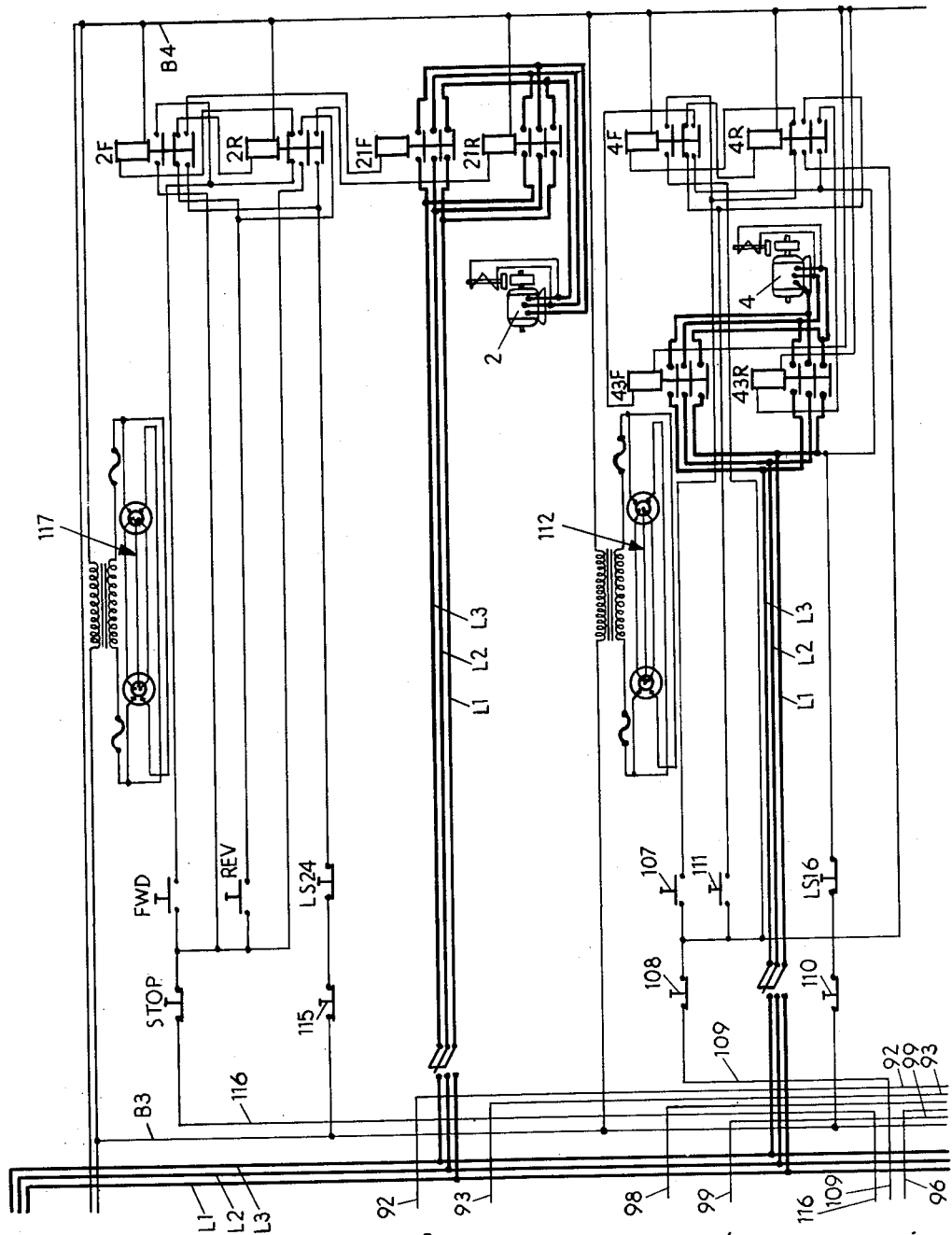

Limit switches LS3 and LS4 (Figs. 1a and 6) are controlled by reverse rectilinear travel of the truck on top of the tractor mast relative to the boom S2 and may correspond, for example, with the switches 30 seen in Fig. 3 of my said Patent No. 2,632,558.

Limit switch LS9 (Figs. 1b and 2) is operated by extreme right swing of the boom S2, and limit switch LS10 (Figs. 1b, 1c and 2) is operated by extreme left swing of the boom S2. Under normal conditions limit switches LS9 and LS10 will be closed and relays 7CR and 6CR energized over an obvious circuit.

Assuming that limit switch LS6 (Figs. 1b and 4) is closed (no undesirable tilt of tractor mast present), relay 8CR (Fig. 2) will be energized over an obvious circuit. With limit switches LS3 and LS4 (Figs. 1b and 6) closed, relay 5CR (Fig. 2) will be energized over an obvious circuit.

Under these normal conditions the system is conditioned for the operation of the two motors 5 and 6 (Fig. 1) which drive the outer and inner crawler, respectively, of the tractor for the stacker 20, which tractor may in general follow the construction of my said Patent No. 2,632,558, it being understood that each of the crawlers is provided with an individual driving motor.

With relays 8CR and 5CR (Fig. 2) energized, the two crawler motors 5 (Figs. 1 and 6) and 6 (Figs. 1 and 5) may be energized as follows: Upon closing the forward push button switch 81 (Fig. 6) relay 5F (Fig. 6) will be energized over the following circuit: from line B2 to one side of the coil of relay 5F, thence through the normally closed intermediate contacts of relay 5R, thence by a conductor 82 across Fig. 4 to Fig. 2 over the now closed third contacts of relay 6CR, thence by a conductor 83 which extends across Fig. 4 to switch 81 which is temporarily closed, thence through stop switch 84 through conductor 85 which extends across Fig. 4 to Fig. 2 and across the now closed lower contacts of relay 8CR, thence along an extension of conductor 85 to the now closed lower contacts of relay 5CR to line B1.

Relay 5F (Fig. 6) on energizing energizes relay 55F (Fig. 6) over its lower contacts through an obvious circuit which extends through limit switch LS8 and a normally closed stop switch 86. Limit switch LS8 is operated essentially in the same manner that limit switch LS4 is operated, but it is operated prior to the operation of limit switch LS4, that is, limit switch LS8 is operated by the truck at the top of the boom tractor mast when said truck reaches a predetermined inner position relative to said boom. When this normally closed limit switch LS8 is open it disables relays 55F and 55R and makes it impossible to run motor 5 which drives the outside crawler of the boom tractor (Figs. 1 and 6). Limit switch LS8 will not ordinarily be allowed to open because the truck on top of the tractor mast which supports the boom is provided with the Selsyn transmitter 87, the receiver of which is placed in the operator's cab so as to indicate to the operator at all times the position of said truck relative to the longitudinal axis of said boom. This Selsyn system including the transmitter 87 and a receiver 88, which is of general standard design, is illustrated in Fig. 5 of the drawings.

Relay 5F when energized as above set forth provides a hold-in circuit through its normally open upper contacts which shunt the push button 81. Relay 55F when energized as above set forth closes an obvious circuit to the traction motor 5 for the front crawler of the boom truck, assuming that its disconnect switch is closed. This power circuit which extends to the lines L1, L2 and L3 is clearly illustrated in Fig. 6 of the drawings. To stop the motor 5 the normally closed stop button 84 is opened which de-energizes relay 5F which in turn opens the circuit and de-energizes relay 55F.

Figure 4:
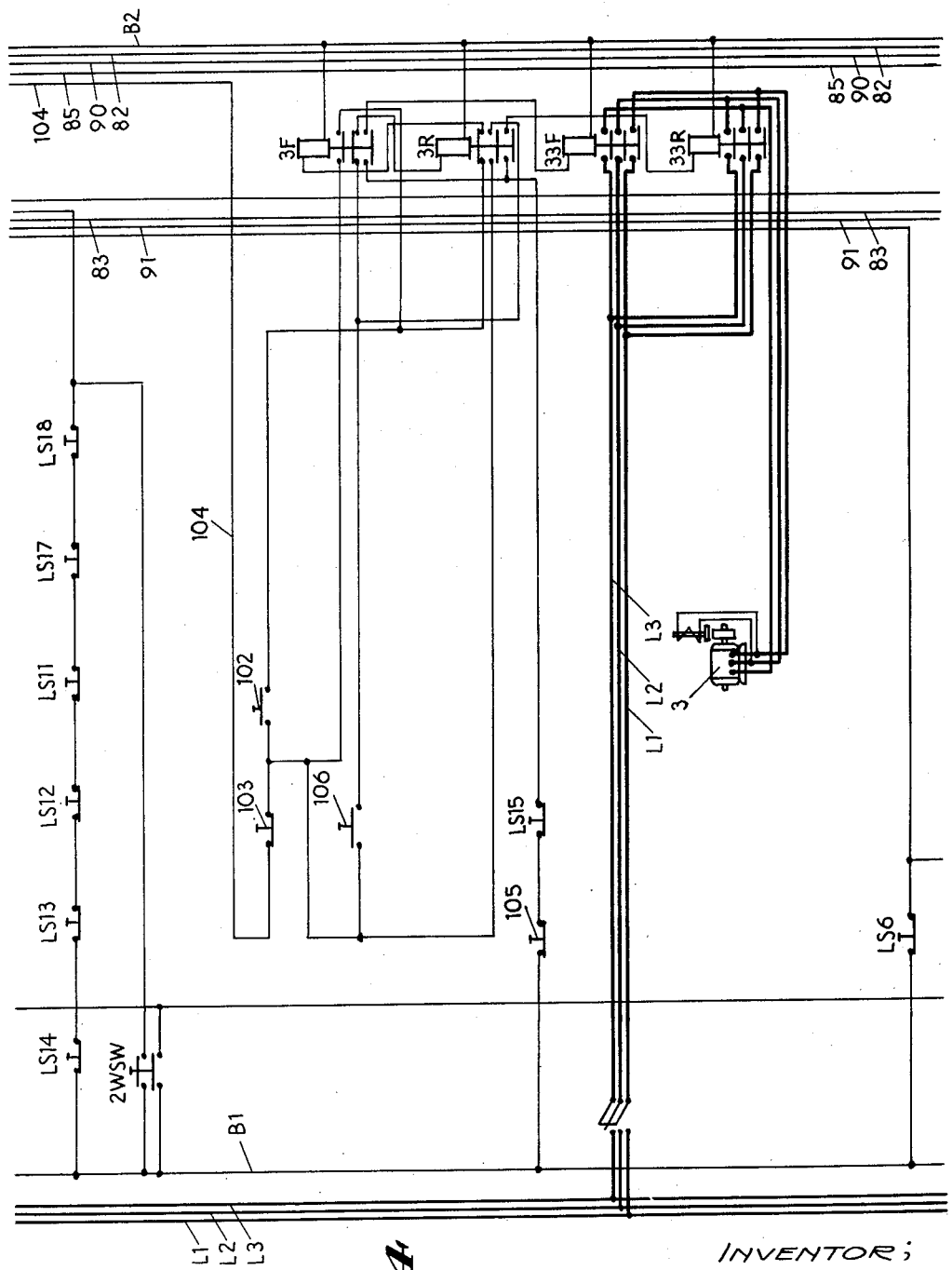

If the reverse push button switch 89 (Fig. 6) is closed, relay 5R is energized over a circuit which extends from line B2 to the coil of relay 5R, then through the intermediate normally closed contacts of relay 5F, which provides an interlock with this relay, then to conductor 90 which extends across Fig. 4 to Fig. 2 and through the now closed third contacts of relay 7R, the circuit continuing by way of conductor 91 across Fig. 4 to Fig. 6 through the momentarily closed reverse switch 89 and then to the normally closed stop switch 84 and over the circuit previously described for the operation of relay 5F. Relay 5R closes a hold-in circuit which by-passes the switch 89, the hold-in circuit including its upper contacts. At its lower contacts relay 5R closes an obvious circuit to motor reversing relay 55R through limit switch LS8 and stop switch 86.

Reversing relay 55R reverses the connections to the motor 5 as compared with those of relay 55F to drive the front tractor crawler in the reverse direction. It may be noted that if limit switch LS8 should be actuated it will drop out relay 55F or 55R, whichever is energized, without releasing relay 5F or 5R.

To start the crawler motor 6 for the inner crawler of the stacker tractor (Fig. 1 and Fig. 5) relay 6F (Fig. 5) is energized over a circuit which extends from line B4 to the coil thereof, then through the normally closed interlocking upper contacts of reversing relay 6R to conductor 92 which extends across Fig. 3 to Fig. 2 to the now closed lower contacts of relay 6CR (Fig. 2), then by conductor 93 which extends across Fig. 3 to Fig. 5, then through forward push button switch 94 (Fig. 5) and normally closed stop switch 95, then by conductor 96 to Fig. 3, thence to Fig. 2, across the lower contacts of relay 8CR which are now closed, thence by previously described conductor 85 through the lower now closed contacts of relay 5CR (Fig. 2), thence to the other line B1.

Relay 6F on energizing opens its normally closed upper contacts which provides the interlock with relay 6R. Its intermediate contacts upon closing provide a hold-in circuit in that they by-pass push button switch 94. The lower contacts of relay 6F energize relay 65F over an obvious circuit including limit switch LS7 and stop switch 97. Limit switch LS7 is comparable with limit switch LS8 of Fig. 6, except that it is operated when the truck on top of the boom tractor mast has reached its outer extreme limit. Relay 65F on energizing closes an obvious circuit to energize traction motor 6.

To effectuate reverse operation of the traction motor 6 of Fig. 5, relay 6R is energized over a circuit which extends from line B4 to the coil thereof, thence over the normally closed upper contacts of relay 6F, then by conductor 98 to Fig. 3 which extends to the now closed lower contacts of relay 7CR (Fig. 2). Conductor 99 extends from said contacts to Fig. 3, then through the reversing switch 100, then through stop switch 95 to conductor 96 which is connected to a line B1 as above described.

Relay 6R on energizing opens its upper interlocking contacts for relay 6F. Its intermediate contacts close to provide a hold-in bypass circuit for the reversing switch 100. Its lower contacts close to energize reversing relays 65R over an obvious circuit including limit switch LS7 and stop switch 97.

BOOM LIMIT SWITCHES, ETC.

Limit switch LS10 (Figs. 1b, 1c and 2) is opened only when the boom S2 reaches its extreme left-hand position as viewed in Fig. 1. When closed as it normally is it energizes relay 6CR (Fig. 2) direct. When open, relay 6CR drops out and prevents energization of relays 5F (Fig. 6) and 6F (Fig. 5), thus preventing forward movement of either of the motors 5 or 6 (Figs. 6 and 5, respectively). It does not prevent reverse movement of these motors.

Limit switch LS9 (Figs. 1b and 2) controls relay 7CR direct. Said limit switch LS9 is closed unless the boom S2 has reached its extreme right position of swing, as viewed in Fig. 1. When relay 7CR is de-energized, relays 5R (Fig. 6) and 6R (Fig. 5) cannot be energized, and reverse movement of the motors 5 and 6 is prevented. Forward movement of said motors is not affected by this limit switch.

Limit switch LS6 (Fig. 4), which is controlled by the truck pedestal tilt, controls relay 8CR (Fig. 2) direct.

Relay 8CR when energized disables relays 5F and 5R (Fig. 6) and 6F and 6R (Fig. 5), making all normal operation of the motors 5 (Fig. 6) and 6 (Fig. 5) impossible and, in fact, making operation of the crawler motors 1, 2, 3 and 4 of the head section S1 impossible, as hereinafter described more completely.

Limit switches LS3 and LS4 (Fig. 6) are in series and are operated on opposite extreme movements of the truck on top of the tractor mast, which truck supports the boom S2. When either of these switches is opened, relay 5CR (Fig. 2) is disabled, thus preventing the energization of relays 5F or 5R (Fig. 6) or relays 6F or 6R (Fig. 5) and makes all normal operation of tractor crawler motors 5 and 6 impossible, as well as making impossible the operation of head section crawler motors 1, 2, 3 and 4 as hereinafter described.

Limit switch LS7 (Fig. 5) is controlled by the outward travel of the truck on the tractor boom mast and is engaged prior to actuation of limit switch LS3. When open it disables forward and reversing relays 65F and 65R of motor 6 of the inner crawler of the boom tractor. Limit switch LS8 (Fig. 6) is similar to limit switch LS7 but on the opposite end and it disables forward and reverse relays 55F and 55R of motor 5, thus disabling the outer crawler motor of the boom tractor.

BY-PASS CIRCUITS FOR CERTAIN LIMIT SWITCHES

To make possible a correcting operation and thus to operate the crawler motors 5 and 6, even though the tractor mast tilt switch LS6 has been opened or either of the tractor mast truck limit switches LS3 or LS4 have been opened, I provide by-pass circuits for them. Switch 3WSW (Fig. 6) is a type of switch which when closed will remain closed until manually opened. Its upper contacts provide an obvious by-pass around limit switch LS6 (Fig. 4), thus disabling switch LS6 when by-pass switch 3WSW is closed. The intermediate contacts of switch 3WSW provide an obvious by-pass around limit switches LS3 and LS4 (Fig. 6), thus disabling them. The lower contacts of switch 3WSW close an obvious circuit to a buzzer 101 (Fig. 2) which is in the cab and which will sound whenever by-pass switch 3WSW is closed, thus giving a warning to the operator of its closed condition.

Switch 2WSW (Fig. 4) is generally similar in structure and function to switch 3WSW and when closed it provides an obvious by-pass for limit switches LS14, LS13, LS12, LS11, LS17 and LS18 at its upper contacts. At its lower contacts it energizes buzzer 101 (Fig. 2).

Switch 1WSW (Fig. 2) is generally similar to switches 3WSW and 2WSW and when closed provides an obvious by-pass for limit switches LS22, LS21, LS19, LS20, LS25 and LS26 at its upper contacts. Its lower contacts energize buzzer 101.

CONTROL OF TRACTION MOTORS FOR CRAWLERS OF HEAD SECTION S1 OF THE TRAILING OR MOBILE CONVEYER

(a) Front bolster limit switches

Limit switches LS14, LS13, LS12 and LS11 (Figs. 1e, 1f and 4) are associated with the front bolster 227 of the head section S1. Limit switch LS14 opens in response to excessive left tilt of the boom, and limit switch LS13 opens in response to excessive right tilt thereof. They may correspond, for example, to the left and right switches 38 seen in Fig. 6 of my applications, Serial No. 145,501 and Serial No. 215,499, now Patent No. 2,642,984. Limit switch LS12 opens in response to excessive left slew of the front axle of the head section S1 and limit switch LS11 opens in response to excessive right slew thereof. They may correspond, for example, to limit switches 42 seen in Fig. 5 of my said application, Serial No. 145,501, and seen in Fig. 3 of my said application, Serial No. 215,499, now Patent No. 2,642,984.

Limit switch LS17 opens in response to excessive left drift of the front axle of the head section S1, and limit switch LS18 opens in response to excessive right drift thereof (see Fig. 1i). They may correspond, for example, to limit switches 27 seen in Fig. 4 of my application, Serial No. 145,502, filed September 21, 1950, and now abandoned.

Assuming that all of the limit switches LS14 (Fig. 4), LS13, LS12, LS11, LS17 and LS18 are closed, relay 3CR (Fig. 2) will be energized over an obvious circuit.

(b) Rear bolster limit switches

Limit switches LS22 (Fig. 2) and LS21 are similar to limit switches LS14 and LS13 respectively, except that they are controlled by the left and right tilt, respectively, of the rear bolster. Limit switches LS19 and LS20 are similar to limit switches LS12 and LS11 respectively, except that they are controlled by the left and right slew, respectively, of the rear bolster. Limit switches LS25 and LS26 are similar to limit switches LS17 and LS18 respectively, except that they are controlled by the left and right drift, respectively, of the rear bolster. When all of these switches are closed, relay 1CR (Fig. 2) will be energized over an obvious circuit.

(c) To control motor 3 (Fig. 4) on left front crawler of head section S1

To effect forward rotation of the motor 3 and associated crawler on the left front of the head section S1 (Fig. 1) the forward push button switch 102 (Fig. 4) is closed to energize relay 3F, the circuit of which extends from line B2 to the coil of said relay, then to the interlocking upper normally closed contacts of reversing relay 3R, then through now closed switch 102, normally closed contacts of stop switch 103, to conductor 104 which extends to Fig. 2 and over the intermediate contacts of relay 8CR which are now closed, the circuit extending to the second now closed contacts of relay 7CR, then to the second now closed contacts of relay 6CR, thence to the intermediate now closed contacts of relay 5CR, thence to the lower now closed contacts of relay 1CR, thence to the lower now closed contacts of relay 3CR, and then to line B1.

A hold-in circuit for relay 3F is provided through its upper contacts which by-pass the forward starting switch 102. At its lower contacts relay 3F energizes relay 33F over an obvious circuit through limit switch LS15 and a normally closed stop switch 105. Limit switch LS15 (Fig. 1i) is a correcting switch operated by excessive right drift and may correspond, for example, to one of the limit switches 26 shown in Figs. 4 and 5 of my said abandoned application, Serial No. 145,502. This means that traction driving motor 3 will be de-energized in any case where the right drift of the head section S1 reaches a correcting stage. This switch is operated by a lesser amount of right drift than is required to operate the disabling right drift limit switch LS26 above described.

Relay 33F (Fig. 4) on being energized closes an obvious circuit to the crawler motor 3 when the disconnect switch leading to the power lines L1, L2 and L3 is closed. To reverse the motor 3 it is necessary first to de-energize relay 3F, for example, by opening the stop switch 103. Stop switch 105 may be used to de-energize relay 33F without de-energizing relay 3F. If relay 3F has been de-energized, as above set forth, relay 3R may be energized by closing the reversing push button switch 106, the circuit extending from line B2 to the coil of relay 3R, through the interlocking normally closed contacts of relay 3F, through the now closed contacts of switch 106, thence to the aforedescribed line 104, through stop switch 103, the circuit extending from conductor 104 as above described for relay 3F. The intermediate contacts of relay 3R provide a hold-in circuit which shunts the switch 106. Its lower contacts energize relay 33R over an obvious circuit including limit switch LS15 and stop switch 105. Relay 33R on energizing connects the motor 3 to the power lines to reverse its direction of rotation.

(d) To control motor 4 (Fig. 3) on right front crawler of head section S1

To effect forward rotation of the motor 4 and associated crawler on the right front of the head section S1 (Fig. 3), the forward push button switch 107 (Fig. 3) is closed to energize relay 4F, the circuit of which extends from line B4 to the coil of said relay, then to the interlocking upper normally closed contacts of reversing relay 4R, then through now closed switch 107, normally closed contacts of stop switch 108, to conductor 109 which extends to Fig. 2 where it joins with previously described conductor 104 and extends to line B1 over the contacts of relays 8CR, 7CR, 6CR, 5CR, 1CR and 3CR in the manner above described for said conductor 104.

A hold-in circuit for relay 4F is provided through its upper contacts which by-pass the forward starting switch 107. At its lower contacts relay 4F energizes relay 43F over an obvious circuit through limit switch LS16 and a normally closed stop switch 110. Limit switch LS16 is a correcting switch operated by excessive left drift and may correspond, for example, to one of the limit switches 26 shown in Figs. 4 and 5 of my said abandoned application, Serial No. 145,502. This means that traction driving motor 4 will be de-energized in any case where the left drift of the head section S1 reaches a correcting stage. This switch is operated by a lesser amount of left drift than is required to operate the disabling left drift limit switch LS25 (Fig. 2) above described.

Relay 43F (Fig. 3) on being energized closes an obvious circuit to the crawler motor 4 when the disconnect switch leading to the power lines L1, L2 and L3 is closed. To reverse the motor 4 it is necessary first to de-energize relay 4F, for example, by opening the stop switch 108. Stop switch 110 may be used to de-energize relay 43F without de-energizing relay 4F. If relay 4F has been de-energized, as above set forth, relay 4R may be energized by closing the reversing push button switch 111, the circuit extending from line B4 to the coil of relay 4R, through the interlocking normally closed contacts of relay 4F, through the now closed contacts of switch 111; thence to the aforedescribed line 109 through stop switch 108, the circuit extending from conductor 109 as above described for relay 4F.

The intermediate contacts of relay 4R provide a hold-in circuit which shunts the switch 111. Its lower contacts energize relay 43R over an obvious circuit including limit switch LS16 and stop switch 110. Relay 43R on energizing connects the motor 4 to the power lines to reverse its direction of rotation.

The front axle of the head section S1 operates the transmitter of a Selsyn system generally designated 112, the receiver of which is in the operator's cab, thus indicating to the operator the angularity between the front axle and the longitudinal axis of said head section S1. The transmitter of this system is operated by the structure illustrated in Figs. 1e and 1f of the drawings.

(e) *Control of motor 1 (Fig. 2) on left rear crawler of head section S1*

On Fig. 2 of the drawings motor 1 is illustrated, which, as seen in Fig. 1, is a motor for driving the rear left-hand crawler of the head section S1. Control of this motor in reverse directions is through the relays 1F and 1R and the relays 11F and 11R controlled thereby, respectively, all through the right drift limit switch LS23 and associated stop switch 113. Since these circuits are essentially reproductions of the above described circuits for controlling motors 3 and 4, it is believed they need no special description except to note that in extending the circuit through the relays 8CR, 7CR, 6CR, 5CR, 3CR and 1CR the extension is made by way of conductor 114 (Fig. 2) which extends over the upper contacts of relay 8CR, then through the upper contacts of relay 7CR, thence through the upper contacts of relay 6CR, thence through the upper contacts of relay 5CR, thence through the upper contacts of relay 3CR, thence through the upper contacts of relay 1CR to line B1.

(f) *Control of motor 2 (Fig. 3) on right rear crawler of head section S1*

On Fig. 3 of the drawings motor 2 is illustrated, which, as seen in Fig. 1 of the drawings, constitutes the driving motor for the rear right-hand crawler traction device of the head section S1. Control of this motor in reverse directions is through the relays 2F and 2R and the relays 21F and 21R controlled thereby, respectively, all through the left drift limit switch LS24 and associated stop switch 115. Since these circuits are essentially reproductions of the above described circuits for controlling motors 3 and 4, it is believed they need no special description except to note that in extending the circuit through the relays 8CR, 7CR, 6CR, 5CR, 3CR and 1CR the extension is made by way of conductor 116 (Figs. 2 and 3) which has a common terminal with conductor 114 of motor 1 at the upper contact of relay 8CR.

The rear axle of the head section S1 operates the transmitter of a Selsyn system generally designated 117, the receiver of which is in the operator's cab, thus indicating to the operator the angularity between the rear axle and the longitudinal axis of said head section S1. The transmitter of this system may be operated as illustrated in Figs. 5 and 9 of the drawings of my said application, Serial No. 145,501 wherein a Selsyn transmitter 50 is illustrated.

In the normal operation of this stacker system the trailing conveyer 23 (Fig. 1) will be moved forward in steps in a generally rectilinear path by the traction crawlers driven by motors 1, 2, 3 and 4. This forward motion will be controlled entirely manually. The guiding of said trailing conveyer will, however, be automatic as above described. With the head section S1 stationary the boom S2 will be swung through a predetermined angle determined by the positions of the limit switches LS9 and LS10. When either of said limit switches LS9 or LS10 is operated the boom S2 may only be swung in a reverse direction. The swinging movement of the boom S2 will be under the control of the operator who controls the traction motors 5 and 6 except for the automatic operations above described.

CERTAIN GENERAL CONDITIONS

In the operation of the system with the head section S1 actuated by the feeler device 317 and associated rail 219 and controlling limit switches LS15, LS16, LS17 and LS18, it is intended that said correcting limit switches, such as LS15 (Fig. 4) for motor 3, and LS16 (Fig. 3) for motor 4, be actuated to effect their correcting influence on a relatively small angular movement of the associated front axle and prior to the time that the limit switches LS11 or LS12 (Fig. 4) are actuated. Where it is desired to move the stacker unit about freely rather than follow a general straight line as provided by a guiding rail 219, the tell-tale guiding mechanism 317 is preferably lifted, as illustrated in Fig. 1h of the drawings to disable the operating mechanism for limit switches LS15 (Fig. 4) and LS16 (Fig. 3). This also, of course, renders ineffective limit switches LS17 and LS18 (Fig. 4).

Obviously those skilled in the art may make various changes in the details and arrangement of parts without departing from the spirit and scope of the invention as defined by the claims hereto appended, and applicant therefore wishes not to be restricted to the precise construction herein disclosed.

Having thus described and shown an embodiment of the invention, what it is desired to secure by Letters Patent of the United States is:

1. A stacker system including a trailing conveyer, front and rear axles therefor, traction devices at opposite ends of said axles, means mounting said conveyer on said axles for relative swinging movement about upright axes, and control means for said traction devices operable by the variation of said trailing conveyer from a predetermined path.

2. A stacker system including a trailing conveyer, front and rear axles therefor, traction devices at opposite ends of said axles, means mounting said conveyer on said axles for relative swinging movement about upright axes, and control means for said traction devices operable by the angular swing of said axles relative to said trailing conveyer, said control circuits having by-pass circuits and associated alarm means.

3. A stacker system including a trailing conveyer, front and rear axles therefor, traction devices at opposite ends of said axles, means mounting said conveyer on said axles for relative swinging movement about upright axes, and control means for said traction devices operable by the angular swing of said axles relative to said trailing conveyer.

4. A stacker system including a trailing conveyer, front and rear axles therefor, traction devices at opposite ends of said axles, means mounting said conveyer on said axles for relative swinging movement about upright axes, and control means for said traction devices operable by the variations of said trailing conveyer from a predetermined path, said control circuits having by-pass circuits and associated alarm means.

5. A stacker system including a trailing conveyer, front and rear axles therefor, traction devices at opposite ends of said axles, means mounting said conveyer on said axles for relative swinging movement about upright axes, control means for said traction devices operable by the variation of said trailing conveyer from a predetermined path, additional control means operable on a predetermined angular swing of one or more of said axles relative to said trailing conveyer, and means for rendering the first named control ineffective.

6. A stacker system including a trailing conveyer, front and rear axles therefor, traction devices at opposite ends of said axles, means mounting said conveyer on said axles for relative swinging movement about upright axes, control means for said traction devices operable by the variation of said trailing conveyer from a predetermined path, and additional control means operable on a predetermined angular swing of one or more of said axles relative to said trailing conveyer.

7. A stacker system including a trailing conveyer, front and rear axles therefor, traction devices at opposite ends of said axles, means mounting said conveyer on said axles for relative swinging movement about upright axes, control means for said traction devices operable by the variation of said trailing conveyer from a predetermined path, and additional control means operable on a predetermined angular swing of one or more of said axles relative to said trailing conveyer, said additional controls being operable upon a greater swing of said axles than is required to operate said first named controls.

References Cited in the file of this patent

UNITED STATES PATENTS 2,632,558  Mercier _____ Mar. 24, 1953